(12) United States Patent
Karl et al.

(10) Patent No.: US 12,480,959 B2
(45) Date of Patent: Nov. 25, 2025

(54) CIRCULATING ESM-1 (ENDOCAN) IN THE ASSESSMENT OF ATRIAL FIBRILLATION AND/OR STROKE

(71) Applicants: Roche Diagnostics Operations, Inc., Indianapolis, IN (US); Maastricht University Medical Center, Maastricht (NL)

(72) Inventors: Johann Karl, Peissenberg (DE); Peter Kastner, Murnau am Staffelsee (DE); Roberto Latini, Milan (IT); Serge Masson, Monza (IT); Ursula-Henrike Wienhues-Thelen, Krailling (DE); Andre Ziegler, Laeufelfingen (CH); Manuel Dietrich, Schongau (DE); Ulrich Schotten, Aachen (DE); Vinzent Rolny, Munich (DE)

(73) Assignees: Roche Diagnostics Operations, Inc., Indianapolis, IN (US); Universiteit Maastricht, LK Maastricht (NL); Academisch Ziekenhuis Maastricht, HX Maastricht (NL)

( * ) Notice: Subject to any disclaimer, the term of this patent is extended or adjusted under 35 U.S.C. 154(b) by 0 days.

(21) Appl. No.: 16/264,779

(22) Filed: Feb. 1, 2019

(65) Prior Publication Data

US 2019/0162737 A1    May 30, 2019

Related U.S. Application Data

(63) Continuation of application No. PCT/EP2017/069864, filed on Aug. 4, 2017.

(30) Foreign Application Priority Data

Aug. 4, 2016    (EP) .................................... 16182825

(51) Int. Cl.
*G01N 33/53*    (2006.01)
*A61B 5/318*    (2021.01)
*G01N 33/68*    (2006.01)

(52) U.S. Cl.
CPC ......... *G01N 33/6893* (2013.01); *A61B 5/318* (2021.01); *G01N 2333/4712* (2013.01); *G01N 2333/58* (2013.01); *G01N 2800/2871* (2013.01); *G01N 2800/325* (2013.01); *G01N 2800/326* (2013.01)

(58) Field of Classification Search
CPC ......... G01N 33/6893; G01N 2800/326; G01N 2800/325; G01N 2333/4712; G01N 2333/58; G01N 2800/2871; G01N 2800/50; A61B 5/318
See application file for complete search history.

(56) References Cited

U.S. PATENT DOCUMENTS

| | | | |
|---|---|---|---|
| 4,016,043 A | 4/1977 | Schuurs et al. | |
| 4,018,653 A | 4/1977 | Mennen | |
| 4,424,279 A | 1/1984 | Bohn et al. | |
| 2004/0167067 A1* | 8/2004 | Griggs | A61P 9/00 536/23.1 |
| 2008/0171354 A1 | 7/2008 | Hess et al. | |
| 2013/0085079 A1* | 4/2013 | Gill | G01N 33/6893 506/9 |
| 2013/0244892 A1 | 9/2013 | Adourian et al. | |

FOREIGN PATENT DOCUMENTS

| | | |
|---|---|---|
| CN | 103087191 A | 5/2013 |
| CN | 103959060 A | 7/2014 |
| EP | 0648228 B1 | 11/1998 |
| JP | 2012159356 A | 8/2012 |
| WO | 1999/045028 A1 | 9/1999 |
| WO | 02083913 A1 | 4/2002 |
| WO | 2002/039123 A1 | 5/2002 |
| WO | 2002/089657 A2 | 11/2002 |
| WO | 2012/098219 A1 | 7/2012 |
| WO | 2012/107419 A1 | 8/2012 |
| WO | 2013/057135 A1 | 4/2013 |
| WO | 2014/072500 A1 | 5/2014 |
| WO | 2014/135488 A1 | 9/2014 |

OTHER PUBLICATIONS

Karbay et al (Chest World Congress, Poster Abstract Apr. 2016).*
Kanagala et al (Circulation 2003; vol. 107, No. 20).*
Torzewski et al, (Flindawl Publishing Corporation, Mediators of Inflammation, vol. 2014, Articles ID 683598, pp. 1-7.*
Van Der Vekens et al., (Cardiovascular Endocrinology, 2013, vol. 2, No. 4,pp. 67-76).*
Wolf et al.(Stroke 1991;vol. 22 No. 8 pp. 983-988).*
Hijazi et al. (Circulation,2012;125:16058-1616).*
Dobesh et al. (Drugs 2016,75:167-144.*
2014 AHA/ACC/HRS Guideline for the Management of Patients With Atrial Fibrillation.*
Synergy HT Operator manual, 2008; retrieved from https://med-fom-avgaylab.sites.olt.ubc.ca/files/2018/04/Bio-Tek_Synergy_HT_User_Manual.pdf.*
Hudson ELISA automation (2002; retrieved from https://nrroo11m6ls29bj7550mg916-wpengine.netdna-ssl.com/images/Library_Files/AppNotes/ab104a_elisa.pdf.*
Lellouche (Am.J.Cardiol 2005; 95:1380-1382.*
Hussein et al (Circulation 2011;123:2077-2082.*

(Continued)

*Primary Examiner* — Gary Counts
(74) *Attorney, Agent, or Firm* — Taft Stettinius & Hollister LLP

(57) ABSTRACT

Disclosed is a method for assessing atrial fibrillation in a subject, said method comprising the steps of determining the amount of ESM-1 in a sample from the subject, and comparing the amount of ESM-1 to a reference amount, whereby atrial fibrillation is to be assessed. Moreover, a method for diagnosing heart failure and/or at least one structural or functional abnormality of the heart associated with heart failure is disclosed.

11 Claims, 9 Drawing Sheets

(56) References Cited

OTHER PUBLICATIONS

Arman, Yucel et al., Effect of Glycemic Regulation on Endocan Levels in Patients With Diabetes: A Preliminary Study, Angiology, 2016, pp. 239-244, vol. 67, No. 3.

Bonow, Robert O., New Insights Into the Cardiac Natriuretic Peptides, Circulation, 1996, pp. 1946-1950, vol. 93.

Borgan, Ømulf et al., Exposure stratified case-cohort designs, Lifetime Data Analysis, 1998, pp. 39-58, vol. 6.

Béchard, David et al., Endocan is a Novel Chondroitin Sulfate/ Dermatan Sulfate Proteoglycan That Promotes Hepatocyte Growth Factor/Scatter Factor Mitogenic Activity, The Journal of Biological Chemistry, 2001, pp. 48341-48349, vol. 276, No. 51.

Chelazzi, Cosimo et al., Glycocalyx and sepsis-induced alterations in vascular permeability, Critical Care, 2015, 7 pp., vol. 19, No. 26.

Chugh, Sumeet S. et al., Worldwide Epidemiology of Atrial Fibrillation A Global Burden of Disease 2010 Study, Circulation, 2014, pp. 837-847, vol. 129.

Delehedde, Maryse et al., Endocan in Cancers: A Lesson from a Circulating Dermatan Sulfate Proteoglycan, International Journal of Cell Biology, 2013, 11 pp., Article ID 705027.

Disertori, Marcello et al., Rationale and design of the GISSI-Atrial Fibrillation trial: a randomized, prospective, multicentre study on the use of valsartan, an angiotension II AT1-receptor blocker, in the prevention of atrial fibrillation recurrence, Journal of Cardiovascular Medicine, 2006, pp. 29-38, Abstract only, vol. 7, Issue 1.

Fuster, Valentin et al., 2011 ACCF/AHA/HRS Focused Updates Incorporated Into the ACC/AHA/ESC 2006 Guidelines for the Management of Patients With Atrial Fibrillation a Report of the American College of Cardiology Foundation/American Heart Association Task Force on Practice Guidelines, Circulation, 2011, pp. e269-e367, vol. 123.

Gage, Brian F. et al., Validation of Clinical Classification Schemes for Predicting Stroke Results from the National Registry of Atrial Fibrillation, JAMA, 2001, pp. 2864-2870, vol. 285, No. 2.

Ganna, Andrea et al., Risk Prediction Measures for Case-Cohort and Nested Case-Control Designs: An Application to Cardiovascular Disease, American Journal of Epidemiology, 2012, pp. 715-724, vol. 175, No. 7.

Go, Alan S. et al., Prevalence of Diagnosed Atrial Fibrillation in Adults, JAMA, 2001, pp. 2370-2375, vol. 285.

Hart, Robert G. et al., Meta-analysis: Antithrombotic Therapy to Prevent Stroke in Patients Who Have Nonvalvular Atrial Fibrillation, Annals of Internal Medicine, 2007, pp. 857-867, vol. 146.

Hijazi, Ziad et al., The novel biomarker-based ABC (age, biomarkers, clinical history)-bleeding risk score for patients with atrial fibrillation: a derivation and validation study, The Lancet, 2016, 2302-2311, vol. 387.

Hunt, Sharon A. et al., ACC/AHA Guidelines for the Evaluation and Management of Chronic Heart Failure in the Adult: Executive Summary, Journal of the American College of Cardiology, 2001, pp. 2101-2113, vol. 38, No. 7.

Hunt, Sharon Ann et al., ACC/AHA 2005 Guideline Update for the Diagnosis and Management of Chronic Heart Failure in the Adult, Journal of the American College of Cardiology, 2005, pp. e1-e82, vol. 46.

Kali, Arunava and Rathan Shetty, K. S., Endocan: A novel circulating proteoglycan, Indian Journal of Pharmacology, 2014, 579-583, vol. 46, No. 6.

Kirchhof, Paulus et al., 2016 ESC Guidelines for the management of atrial fibrillation developed in collaboration with FACTS, European Heart Journal, 2016, pp. 2893-2962, vol. 37.

Kose, Murat et al., Serum Endocan Level and the Severity of Coronary Artery Disease: A Pilot Study, Angiology, 2014, pp. 727-731, vol. 66, No. 8.

Lassalle, Philippe et al., ESM-1 is a Novel Human Endothelial Cell-specific Molecule Expressed in Lung and Regulated by Cytokines, The Journal of Biological Chemistry, 1996, pp. 20458-20464, vol. 271, No. 34.

Madhivathanan, Pradeep R. et al., Perioperative kinetics of endocan in patients undergoing cardiac surgery with and without cardiopulmonary bypass, Cytokine, 2016, pp. 8-12, vol. 83.

Mark, Steven D. and Katki, Hormuzd A., Specifying and Implementing Nonparametric and Semiparametric Survival Estimators in Two-Stage (Nested) Cohort Studies with Missing Case Data, Journal of the American Statistical Association, 2006, pp. 460-471, vol. 101, No. 474.

Masson, Serge et al., Predicting atrial fibrillation recurrence with circulating inflammatory markers in patients in sinus hythm at high risk for atrial fibrillation: data from the GISSI atrial fibrillation trial, Heart, 2010, pp. 1909-1914, vol. 96.

Matano, Fumihiro et al., Endocan, a new invasion and angiogenesis marker of pituitary adenomas, Journal of Neuro-Oncology, 2014, pp. 485-491, vol. 117.

Menon, Prashanthi et al., Abstract 19140: Targeted Disruption of Endothelial Specific Molecule (ESM)-1 Results in Atrioventricular Valve Malformations Leading to Cardiac Dysfunction, Circulation, 2018, A19140, 5 pp., vol. 126.

Mosevoll, Knut Anders et al., Systemic levels of the endothelium-derived soluble adhesion molecules endocan and E-selectin in patients with suspected deep vein thrombosis, SpringerPlus, 2014, 571, 9 pps., vol. 3.

Mueller, Thomas et al., Long-term stability of endogenous B-type natriuretic peptide (BNP) and amino terminal proBNP (NT-proBNP) in frozen plasma samples, Clinical Chemistry & Laboratory Medicine, 2004, pp. 942-944, vol. 42, No. 8.

Qiu, Chong-Rong et al., Analysis of Serum Endothelial Cell-Specific Molecule 1 (Endocan) Level in Type 2 Diabetes Mellitus With Acute ST-Segment Elevation Myocardial Infarction and its Correlation: A Pilot Study, Angiology, 2017, pp. 74-78, vol. 68, No. 1.

Richter, Mark M., Electrochemiluminescence (ECL), Chemical Reviews, 2004, pp. 3003-3036, vol. 104.

Roudnicky, Filip et al., Endocan is Upregulated on Tumor Vessels in Invasive Bladder Cancer Where it Mediates VEGF-A-Induced Angiogenesis, Cancer Research, 2012, pp. 1097-1106, vol. 73, No. 3.

Staszewsky, Lidia et al., Cardiac Remodeling, Circulating Biomarkers and Clinical Events in Patients with a History of Artrial Fibrillation. Data from the GISSI-AF Trial, Cardiovascular Drugs and Therapy, 2015, pp. 551-561, vol. 29.

Wu, Alan H. B. et al., Analytical and Clinical Evaluation of the Bayer ADVIA Centaur Automated B-Type Natriuretic Peptide Assay in Patients with Heart Failure: A Multisite Study, Clinical Chemistry, 2004, pp. 867-873, vol. 50, No. 5.

Xiong, Chang et al., Elevated Human Endothelial Cell-Specific Molecule-1 Level and its Association with Coronary Artery Disease in Patients with Hypertension, Journal of Investigative Medicine, 2015, pp. 867-870, vol. 63.

Yilmaz, Mahmut I. et al., Plasma endocan levels associate with inflammation, vascular abnormalities, cardiovascular events, and survival in chronic kidney disease, Kidney International, 2014, pp. 1213-1220, vol. 86.

Zweig, Mark H. and Campbell, Gregory, Receiver-Operating Characteristic (ROC) Plots: A Fundamental Evaluation Tool in Clinical Medicine, Clinical Chemistry, 1993, pp. 561-577, vol. 39, No. 4.

Çimen, Tolga et al., Human Endothelial Cell-Specific Molecule-1 (Endocan) and Coronary Artery Disease and Microvascular Angina, Angiology, 2016, pp. 846-853, vol. 67, No. 9.

Balta, Sevket et al., Endocan: A novel inflammatory indicator in cardiovascular disease?, Atherosclerosis, 2015, pp. 339-343, vol. 243.

International Search Report issued Feb. 12, 2018, in Application No. PCT/EP2017/079864, 2 pp.

Rocha, Susana F. et al., Esm1 Modulates Endothelial Tip Cell Behavior and Vascular Permeability by Enhancing VEGF Bioavailability, Circulation Research, 2014, pp. 581-590, vol. 115.

Latini, R. et al., Circulating cardiovascular biomarkers in recurrent atrial fibrillation: data from the GISSI-Atrial Fibrillation Trial, Journal of Internal Medicine, 2011, pp. 160-171, vol. 269.

(56) References Cited

OTHER PUBLICATIONS

Balta et al., Endocan—A Novel Inflammatory Indicator in Newly Diagnosed Patients With Hypertension: A Pilot Study; Angiology, 2014, vol. 65, No. 9, pp. 773-777.
Potpara et al., The Association of CHA2DS2-VASc Score and Blood Biomarkers with Ischemic Stroke Outcomes: The Belgrade Stroke Study; PLOS one; 2014, vol. 9, No. 9, 13-pages.
Wang et al., Serum Endocan Levels are Correlated with the Presence and Severity of Coronary Artery Disease in Patients with Hypertension; Genetic Testing and Molecular Biomarkers; 2015, vol. 19, No. 3, pp. 124-127.
Written Opinion of the International Searching Authority, European Patent Office, International Patent Application No. PCT/EP2017/069864, Feb. 8, 2018, 6 pages.
International Preliminary Report on Patentability, European Patent Office, International Patent Application No. PCT/PCT/EP2017/069864, Oct. 23, 2018, 19 pages.
Conen, Forum Med Suisse, vol. 12, 2012, pp. 860-862.
Dowdy et al., "Statistics for Research", 1983, John Wiley & Sons.
Fuster et al., ACC/AHA/ESC 2006 Guidelines for the Management of Patients With Atrial Fibrillation, Circulation, vol. 114, No. 7, 2006, pp. e257-354.
Uhlen et al., Tissue-based map of the human proteome, Science, vol. 347, No. 6220, 2015, pp. 1260419.
Disertori M et al., Rationale and design of the GISSI-Atrial Fibrillation trial: a randomized, prospective, multicentre study on the use of valsartan, an angiotensin II AT1-receptor blocker, in the prevention of atrial fibrillation recurrence, J Cardiovasc Med., vol. 7, 2006, pp. 29-38.

* cited by examiner

Measurement of ESM-1 in Mapping cohort: Diagnosis of AF; and differentiation between pararoxysmal and persistent AF ROC curve for ESM1 in paroxysmal Afib of Mapping cohort; AUC = 0.61. Diagnosis of AF.

ROC curve for ESM1 in persistent Afib of Mapping cohort; AUC = 0.89. Diagnosis of AF.

Fig. 4. Diagnostic value of ESM-1 in PREDICTOR AFib sub panel. Diagnosis of AF.

Fig. 5. Diagnostic value of ESM-1 in PREDICTOR AFib sub panel; AUC=0.68. Diagnosis of AF.

Fig. 6. ESM-1 in differentiation of Heart Failure (Heart Failure Panel) and Atrial Fibrillation (Mapping Cohort)

Fig. 7. ESM-1 in differentiation of Heart Failure; ROC curve for ESM1; AUC = 0.81

Fig. 8. ESM-1 in differentiation of Atrial Fibrillation; ROC curve for ESM1 in Afib; AUC = 0.98

Fig. 9. Weighted Kaplan-Meier survival estimates for the two groups defined by baseline ESM-1 measurement < 461 pg/ml vs >= 461 pg/ml in BEAT-AF cohort.

CIRCULATING ESM-1 (ENDOCAN) IN THE ASSESSMENT OF ATRIAL FIBRILLATION AND/OR STROKE

CROSS-REFERENCE TO RELATED APPLICATIONS

This application is a continuation of International Application No. PCT/EP2017/069864 filed Aug. 4, 2017, which claims priority to European Application No. 16182825.6 filed Aug. 4, 2016, the disclosures of which are hereby incorporated in their entirety.

SUMMARY OF THE INVENTION

The present invention relates to a method for assessing atrial fibrillation in a subject, said method comprising the steps of determining the amount of ESM-1 in a sample from the subject, and comparing the amount of ESM-1 to a reference amount, whereby atrial fibrillation is to be assessed. Moreover, the present invention relates to a method for diagnosing heart failure and/or at least one structural or functional abnormality of the heart associated with heart failure.

BACKGROUND OF THE INVENTION

Atrial fibrillation (AF) is the most common type of heart arrhythmia and one of the most widespread conditions among the elderly population. Atrial fibrillation is characterized by irregular heart beating and often starts with brief periods of abnormal beating that can increase over time and may become a permanent condition. An estimated 2.7-6.1 million people in the United States have Atrial Fibrillation and approximately 33 million people globally (Chugh S. S. et al., Circulation 2014; 129:837-47). Patients with AF have a higher stroke rate, and are at higher risk of developing congestive heart failure as compared to patients in sinus rhythm.

The diagnosis of heart arrhythmia such as atrial fibrillation typically involves determination of the cause of the arrhythmia, and classification of the arrhythmia. Guidelines for the classification of atrial fibrillation according to the American College of Cardiology (ACC), the American Heart Association (AHA), and the European Society of Cardiology (ESC) are mainly based on simplicity and clinical relevance. The first category is called "first detected AF". People in this category are initially diagnosed with AF and may or may not have had previous undetected episodes. If a first detected episode stops on its own in less than one week, but is followed by another episode later on, the category changes to "paroxysmal AF". Although patients in this category have episodes lasting up to 7 days, in most cases of paroxysmal AF the episodes will stop in less than 24 hours. If the episode lasts for more than one week, it is classified as "persistent AF". If such an episode cannot be stopped, i.e. by electrical or pharmacologic cardioversion, and continues for more than one year, the classification is changed to "permanent AF". An early diagnosis of atrial fibrillation is highly desired because atrial fibrillation is an important risk factor for stroke and systemic embolism (Hart et al., Ann Intern Med 2007; 146(12): 857-67; Go A S et al. JAMA 2001; 285(18): 2370-5).

ESM-1 (also known as endocan) is a proteoglycan composed of a 20 kDa mature polypeptide and a 30 kDa O-linked glycan chain (Bechard D et al., J Biol Chem 2001; 276(51):48341-48349). Both the carboxylates and sulfates of the glycan chain are negatively charged at physiological pH, thus providing binding sites for signaling molecules comprising positively charged amino acids such as growth factors and cytokines (Roudnicky F et al., Cancer Res. 2013; 73(3):1097-106). Biological ESM-1 expression and release from endothelial cells is highly induced by angiogenic mediators VEGF-A, VEGF-C, FGF-2, PI3K and cytokines involved in cancer progression, but also by inflammatory processes (sepsis) (Kali A et al.; Indian J Pharmacol. 2014 46(6): 579-583). ESM-1 binds to and upregulates pro-angiogenic growth factors such as FGF-2, and HGF thereby mediating increased endothelial cell migration and proliferation. Endocan variants lacking the glycan chain failed to induce HGF activation highlighting the role of the glycan (Delehedde M et al.; Int J Cell Biol. 2013:705027). ESM-1 binds to LFA-1 integrin (CD11a/CD18) onto cell surface of blood lymphocytes, monocytes, Jurkat cells with recruitment of circulating lymphocytes to inflammatory sites and LFA-1-dependent leukocyte adhesion and activation.

Soluble ESM-1 has been found as a risk marker for endothelial dysfunction in different cancer types. In addition, the marker was assessed in connection with different cardiovascular conditions or diseases. For example, ESM-1 has been measured in connection with hypertension (Balta S et al.; Angiology. 2014; 65(9):773-7), coronary artery disease as well as myocardial infarction (Kose M et al.; Angiology. 2015, 66(8):727-31). Further, the marker was measured in diabetic patients (Arman Y et al., Angiology. 2016 March; 67(3):239-44). Measurement in various stages of chronic kidney disease led to the conclusion that this marker might be also helpful to predict cardiovascular events and mortality in chronic kidney disease (Yilmaz M I et al., Kidney Int. 2014; 86(6):1213-20).

Mosevoll et al. (Springerplus. 2014 Sep. 30; 3:571) analyzed endocan and E-selectin in patients with suspected deep vein thrombosis. Plasma endocan and E-selectin levels did not differ between patients with thrombosis, healthy controls and the patients without verified thrombosis (i.e. patients with other causes of their symptoms, including various inflammatory and non-inflammatory conditions). However, the combined use of endothelial biomarkers, C-reactive protein and D-dimer could be used to identify patient subsets with different frequencies of venous thrombosis. The increased endocan levels in patients with massive pulmonary embolism were mainly due to the embolism rather than the original thrombosis and/or the affected circulation with pulmonary hypertension/right heart failure. The authors conclude that "increased endocan levels in patients with massive pulmonary embolism are mainly due to the embolism rather than the original thrombosis and/or the affected circulation with pulmonary hypertension/right heart failure" (Mosevoll et al. SpringerPlus 2014, 3:571).

Further, endocan release into the blood has also been considered a biomarker of endothelial dysfunction, alterations in vascular permeability and severity of sepsis (Chelazzi C et al.; Crit Care. 2015; 19(1): 26). Next to inflammatory processes endocan has been also shown to be expressed during angiogenesis process (Matano F et al.; J Neurooncol. 2014 May; 117(3):485-91).

A conference abstract from Menon et al. describes the effect of ESM-1 knockout in the mouse model. The authors observed dilated atria. Further, an upregulation of nppa, nppb and myh7 in knockout hearts was also observed. The authors conclude that ESM-1 disruption would result in cardiac dysfunction (Abstract 19140: Targeted Disruption of Endothelial Specific Molecule (ESM)-1 Results in Atrioventricular Valve Malformations Leading to Cardiac Dysfunction. Prashanthi Menon, Katherine Spokes, David Beeler, Lauren Janes, and William Aird Circulation. 2012; 126: A19140 Volume 126, Issue 21 Supplement; Nov. 20, 2012/ Abstracts From the American Heart Association 2012 Scientific Sessions and Resuscitation Science Symposium)

Xiong et al. measured Endocan levels in patients with hypertension. The marker was described to be increased in hypertensive vs. non-hypertensive patients. Among the hypertension group those patients with coronary artery disease CAD had higher levels than those without (Xiong C. et al., Elevated Human Endothelial Cell-Specific Molecule-1 Level and Its Association With Coronary Artery Disease in Patients With Hypertension. J Investig Med. 2015 October; 63(7):867-70)

Qiu et al. measured ESM-1 in patients with type 2 diabetes mellitus with acute STEMI myocardial infarction (Qiu CR. et al., Angiology. 2017 January; 68(1):74-78). The authors describe a difference in serum ESM-1 level between the Type 2 Diabetes Mellitus group with STEMI (ST-segment elevation myocardial infarction) and a type 2 diabetes mellitus group without vascular disease. Determination of endothelial dysfunction predicts cardiovascular risk as for myocardial infarction.

Cimen et al. investigated the relationship between obstructive coronary artery disease (CAD), microvascular angina (MVA), and plasma levels of endocan (Cimen T. et al., Angiology. 2016; 67(9):846-853). Patients with e.g. atrial fibrillation were not analyzed. CAD patients with microvascular angina (MVA) showed an increase of Esm-1 as compared to CAD controls. The authors propose that the marker might serve as indicator of endothelial dysfunction before apparent cardiovascular diseases.

Madhivathanan et al. analyzed the kinetics of endocan in cardiac surgery patients with respect to acute lung injury as a complication of cardiac surgery (bypass as well as complex surgery). The authors conclude that baseline endocan concentrations are higher in hypertensive patients with critical coronary artery stenosis and that endocan concentrations would be increased after induction of anesthesia but decrease four hours after separation from CPB (Madhivathanan PR. et al., Cytokine. 2016 July; 83:8-12).

WO1999/045028 describes two specific monoclonal antibodies to detect ESM-1

WO2002/039123 describes a kit for detecting ESM-1 protein and the use of ESM-1 to detect in vitro deteriorations to the endothelial vascular wall in humans for the quantification of protein ESM-1 in vitro in a patient treated with an immunosuppressant compound and for the quantification in vitro of ESM-1 in a patient suffering from cancer.

WO2012/098219 describes ESM-1 as a marker for predicting the risk of respiratory failure, renal failure and thrombopenia in a septic patient.

WO2014/135488 describes ESM-1 as a marker for identifying pregnancy related syndrome (e.g. pre-eclampsia and IUGR).

Latini R. et al. (J Intern Med. 2011 February; 269(2): 160-71) measured various circulating biomarkers (hsTnT, NT-proBNP, MR-proANP, MR-proADM, copeptin, and CT-proendothelin-1) in patients with atrial fibrillation.

There is a need for reliable methods for the assessment of atrial fibrillation including the diagnosis of atrial fibrillation, the risk stratification of patients with atrial fibrillation (such as occurrence of stroke), the assessment of the severity of atrial fibrillation, and the assessment of a therapy in patients with atrial fibrillation.

The technical problem underlying the present invention can be seen as the provision of methods for complying with the aforementioned needs. The technical problem is solved by the embodiments characterized in the claims and herein below.

SUMMARY OF THE FIGURES

The figures show.

DETAILED DESCRIPTION OF THE INVENTION

Figure 1:
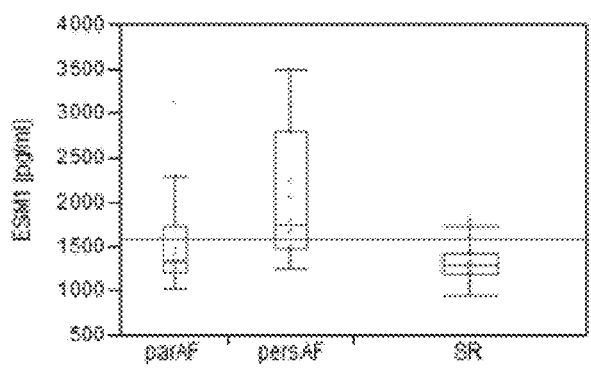
FIG. 1: Measurement of ESM-1 ELISA in the Mapping cohort
Figure 2:
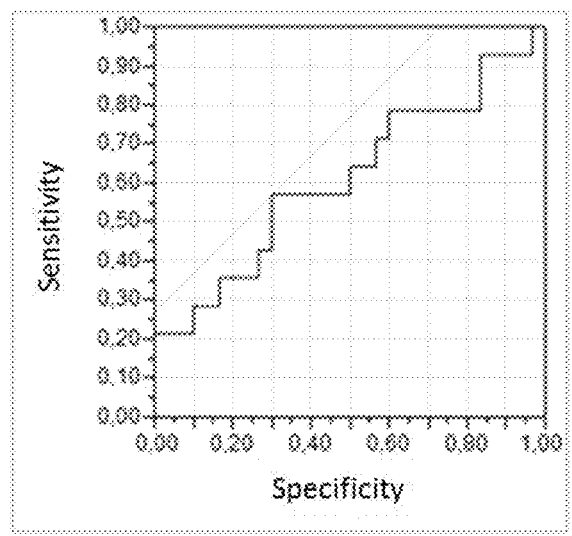
FIG. 2: ROC curve for ESM-1 in paroxysmal Afib of Mapping cohort; AUC=0.61

Advantageously, it was found in the context of the studies of the present invention that the determination of the amount of ESM-1 in a sample from a subject allows for an improved assessment of atrial fibrillation. Thanks to present invention, it can be e.g. diagnosed whether a subject suffers from atrial fibrillation or not The invention also provides a method for stroke prediction. Further, it can be e.g. differentiated between paroxysmal and persistent atrial fibrillation in a subject suffer from atrial fibrillation.

Accordingly, the present invention relates to a method for assessing atrial fibrillation in a subject, comprising the steps of
a) determining the amount of ESM-1 in a sample from the subject, and
b) comparing the amount of ESM-1 to a reference amount, whereby atrial fibrillation is to be assessed.

In an embodiment of method of the present invention, the method further comprises the determination of the amount of a natriuretic peptide in a sample from the subject in step a) and the comparison of the amount of the natriuretic peptide to a reference amount in step b).

Accordingly, the present invention relates to a method for assessing atrial fibrillation in a subject, comprising the steps of
a) determining the amounts of ESM-1 and the amount of a natriuretic peptide in a sample from the subject, and
b) comparing the amounts to reference amounts, whereby atrial fibrillation is to be assessed.

The assessment of atrial fibrillation (AF) shall be based on the results of the comparison step b).

Accordingly, the present invention preferably comprises the steps of
a) determining the amount of ESM-1, and optionally the amount of a natriuretic peptide, in a sample from the subject, b) comparing the amount of ESM-1 to a reference amount and optionally comparing the amount of the natriuretic peptide to a reference amount, and c) assessing atrial fibrillation based on the results of the comparison step b)

The method as referred to in accordance with the present invention includes a method which essentially consists of the aforementioned steps or a method which includes further steps. Moreover, the method of the present invention, preferably, is an ex vivo and more preferably an in vitro method. Moreover, it may comprise steps in addition to those explicitly mentioned above. For example, further steps may relate to the determination of further markers and/or to sample pre-treatments or evaluation of the results obtained by the method. The method may be carried out manually or assisted by automation. Preferably, step (a), (b) and/or (c) may in total or in part be assisted by automation, e.g., by a suitable robotic and sensory equipment for the determination in step (a) or a computer-implemented calculation in step (b).

In accordance with the present invention, atrial fibrillation shall be assessed. The term "assessing atrial fibrillation" as used herein preferably refers to the diagnosis of atrial fibrillation, the differentiation between paroxysmal and persistent atrial fibrillation, the prediction of a risk of an adverse event associated with atrial fibrillation, to the identification of a subject who shall be subjected to electrocardiography (ECG), or to the assessment of a therapy for atrial fibrillation.

As will be understood by those skilled in the art, the assessment of the present invention is usually not intended to be correct for 100% of the subjects to be tested. The term, preferably, requires that a correct assessment (such as the diagnosis, differentiation, prediction, identification or assessment of a therapy as referred to herein) can be made for for a statistically significant portion of subjects. Whether a portion is statistically significant can be determined without further ado by the person skilled in the art using various well known statistic evaluation tools, e.g., determination of confidence intervals, p-value determination, Student's t-test, Mann-Whitney test etc. Details are found in Dowdy and Wearden, Statistics for Research, John Wiley & Sons, New York 1983. Preferred confidence intervals are at least 90%, at least 95%, at least 97%, at least 98%, or at least 99%. The p-values are, preferably, 0.4, 0.1, 0.05, 0.01, 0.005, or 0.0001.

It is known in the art that biomarkers could be increased in various diseases and disorders. This does also apply to ESM-1 which is e.g. known to be increased in cancer patients. However, this is taken into account by the skilled person. Accordingly, the "assessment of atrial fibrillation" is understood as an aid in the assessment of atrial fibrillation, and thus as an aid in diagnosing atrial fibrillation, an aid in differentiating between paroxysmal and persistent atrial fibrillation, an aid in the prediction of a risk of an adverse event associated with atrial fibrillation, an aid in the identification of a subject who shall be subjected to electrocardiography (ECG), or as an aid in the assessment of a therapy for atrial fibrillation.

In a preferred embodiment of the present invention, the assessment of atrial fibrillation is the diagnosis of atrial fibrillation. Accordingly, it is diagnosed, whether a subject suffers from atrial fibrillation, or not.

Accordingly, the present invention envisages a method for diagnosing atrial fibrillation in a subject, comprising the steps of
   a) determining the amount of ESM-1 in a sample from the subject, and
   b) comparing the amount of ESM-1 to a reference amount, whereby atrial fibrillation is to be diagnosed.

In an embodiment, the aforementioned method comprises the steps of:
   a) determining the amounts of ESM-1 and a natriuretic peptide in a sample from the subject, and
   b) comparing the amounts of ESM-1 and the natriuretic peptide to reference amounts, whereby atrial fibrillation is to be diagnosed.

Preferably, the subject to be tested in connection with method for diagnosing of atrial fibrillation is a subject who is suspected to suffer from atrial fibrillation. However, it is also contemplated that the subject already has been diagnosed previously to suffer from AF and that the previous diagnosis is confirmed by carrying out the method of the present invention.

In another preferred embodiment of the present invention, the assessment of atrial fibrillation is the differentiation between paroxysmal and persistent atrial fibrillation. Accordingly, it is determined whether a subject suffers from the paroxysmal or persistent atrial fibrillation.

Accordingly, the present invention envisages a method for differentiating between paroxysmal and persistent atrial fibrillation in a subject, comprising the steps of
   a) determining the amount of ESM-1 in a sample from the subject, and
   b) comparing the amount of ESM-1 to a reference amount, whereby it is differentiated between paroxysmal and persistent atrial fibrillation.

In an embodiment, the aforementioned method comprises the steps of:
   a) determining the amounts of ESM-1 and a natriuretic peptide in a sample from the subject, and
   b) comparing the amounts of ESM-1 and the natriuretic peptide to reference amounts, whereby it is differentiated between paroxysmal and persistent atrial fibrillation.

In another preferred embodiment of the present invention, the assessment of atrial fibrillation is the prediction of the risk of an adverse event associated with atrial fibrillation (such as stroke). Accordingly, it is predicted whether a subject is at risk and/or not as risk of said adverse event.

Thus, the present invention envisages a method for predicting the risk of an adverse event associated with atrial fibrillation in a subject, comprising the steps of
   a) determining the amount of ESM-1 in a sample from the subject, and
   b) comparing the amount of ESM-1 to a reference amount, whereby the risk of the adverse event associated with atrial fibrillation is to be predicted.

In an embodiment, the aforementioned method comprises the steps of:
   a) determining the amounts of ESM-1 and a natriuretic peptide in a sample from the subject, and
   b) comparing the amounts of ESM-1 and the natriuretic peptide to reference amounts, whereby the risk of the adverse event associated with atrial fibrillation is to be predicted.

It is envisaged that various adverse events can be predicted. A preferred adverse event to be predicted is stroke.

Accordingly, the present invention, in particular, contemplates a method for predicting the risk of stroke in a subject, comprising the steps of
   a) determining the amount of ESM-1 in a sample from the subject, and
   b) comparing the amount of ESM-1 to a reference amount, whereby the risk of stroke is to be predicted.

The aforementioned method may further comprise step c) of predicting stroke based on the comparison results of step b). Thus, steps a), b), c) are preferably as follows:
- a) determining the amount of ESM-1 in a sample from the subject, and
- b) comparing the amount of ESM-1 to a reference amount, and
- c) predicting stroke based on the comparison results of step b)

In another preferred embodiment of the present invention, the assessment of atrial fibrillation is the assessment of a therapy for atrial fibrillation.

Accordingly, the present invention envisages a method for the assessment of a therapy for atrial fibrillation in a subject, comprising the steps of
- a) determining the amount of ESM-1 in a sample from the subject, and
- b) comparing the amount of ESM-1 to a reference amount, whereby the therapy for atrial fibrillation is to be assessed.

In an embodiment, the aforementioned method comprises the steps of:
- a) determining the amounts of ESM-1 and a natriuretic peptide in a sample from the subject, and
- b) comparing the amounts of ESM-1 and the natriuretic peptide to reference amounts, whereby the therapy for atrial fibrillation is to be assessed.

Preferably, the subject in connection with the aforementioned differentiation, the aforementioned prediction, and the assessment of a therapy for atrial fibrillation is a subject who suffers from atrial fibrillation, in particular who is known to suffer from atrial fibrillation (and thus to have a known history of atrial fibrillation). However, with respect to the aforementinned prediction method, it is also envisaged that the subject has no known history of atrial fibrillation.

In another preferred embodiment of the present invention, the assessment of atrial fibrillation is the identification of a subject who shall be subjected to electrocardiography (ECG). Accordingly, a subject is identified who is who shall be subjected to electrocardiography, or not.

Thus, the present invention envisages a method for identifying a subject who shall be subjected to electrocardiography, comprising the steps of
- a) determining the amount of ESM-1 in a sample from the subject, and
- b) comparing the amount of ESM-1 to a reference amount, whereby a subject is identified who shall be subjected to electrocardiography.

In an embodiment, the aforementioned method comprises the steps of:
- a) determining the amounts of ESM-1 and a natriuretic peptide in a sample from the subject, and
- b) comparing the amounts of ESM-1 and the natriuretic peptide to reference amounts, whereby a subject is identified who shall be subjected to electrocardiography.

Preferably, the subject in connection with the aforementioned method of identifying a subject who shall be subjected to electrocardiography is a subject who has no known history of atrial fibrillation. The expression "no known history of atrial fibrillation" is defined elsewhere herein.

The term "atrial fibrillation" ("abbreviated" AF or AFib) is well known in the art. As used herein, the term preferably refers to a supraventricular tachyarrhythmia characterized by uncoordinated atrial activation with consequent deterioration of atrial mechanical function. In particular, the term refers to an abnormal heart rhythm characterized by rapid and irregular beating. It involves the two upper chambers of the heart. In a normal heart rhythm, the impulse generated by the sino-atrial node spreads through the heart and causes contraction of the heart muscle and pumping of blood. In atrial fibrillation, the regular electrical impulses of the sino-atrial node are replaced by disorganized, rapid electrical impulses which result in irregular heart beats. Symptoms of atrial fibrillation are heart palpitations, fainting, shortness of breath, or chest pain. However, most episodes have no symptoms. On the electrocardiogram, Atrial Fibrillation is characterized by the replacement of consistent P waves by rapid oscillations or fibrillatory waves that vary in amplitude, shape, and timing, associated with an irregular, frequently rapid ventricular response when atrioventricular conduction is intact.

Figure 3:
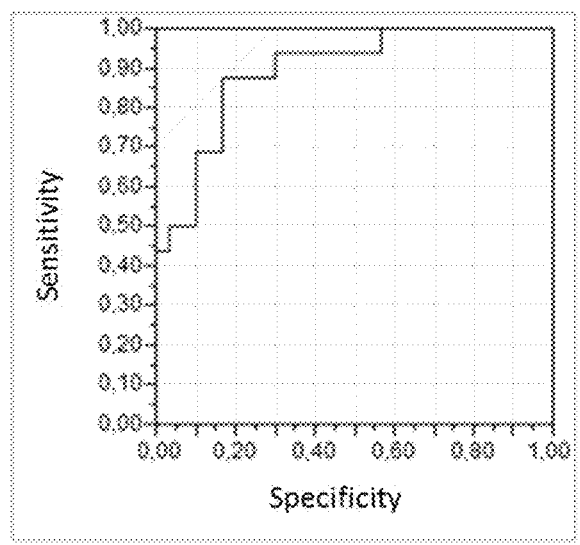
FIG. 3: ROC curve for ESM-1 in persistent Afib of Mapping cohort; AUC=0.89
Figure 4:
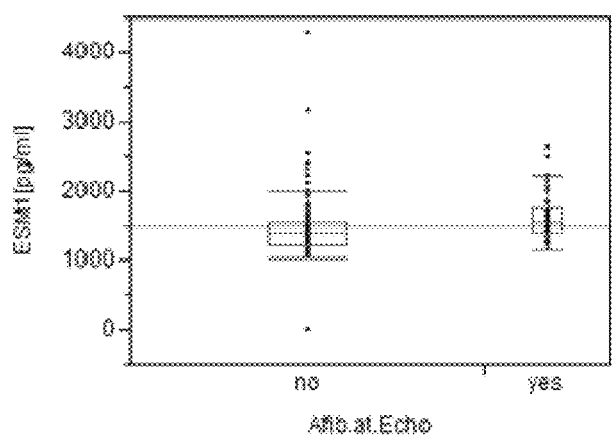
FIG. 4: Diagnostic value of ESM-1 in PREDICTOR AFib sub panel
Figure 5:
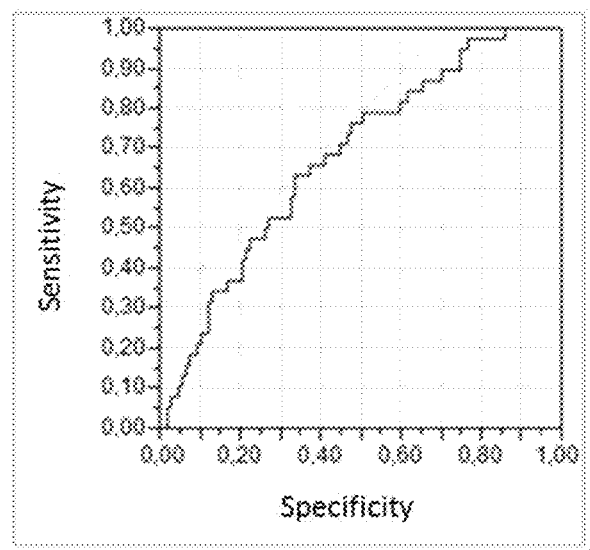
FIG. 5: Diagnostic value of ESM-1 in PREDICTOR AFib sub panel; AUC=0.68

The American College of Cardiology (ACC), American Heart Association (AHA), and the European Society of Cardiology (ESC) propose the following classification system (see Fuster V. et al., Circulation 2006; 114 (7): e257-354 which herewith is incorporated by reference in its entirety, see e.g. FIG. 3 in the document): First detected AF, paroxysmal AF, persistent AF, and permanent AF.

All people with AF are initially in the category called first detected AF. However, the subject may or may not have had previous undetected episodes. A subject suffers from permanent AF, if the AF has persisted for more than one year, and in particular, conversion back to sinus rhythm does not occur (or only with medical intervention). A subject suffers from persistent AF, if the AF lasts more than 7 days. The subject may require either pharmacologic or electrical intervention to terminate Atrial Fibrillation. Preferably, persistent AF occurs in episodes, but the arrhythmia does not convert back to sinus rhythm spontaneously (i.e. without medical intervention). Paroxysmal Atrial Fibrillation, preferably, refers to an intermittent episode of Atrial Fibrillation which lasts up to 7 days. In most cases of paroxysmal AF, the episodes last less than 24 hours. The episode of Atrial Fibrillation terminates spontaneously, i.e. without medical intervention. Thus, whereas the episode(s) of paroxysmal atrial fibrillation preferably terminate spontaneously, persistent atrial fibrillation preferably does not end spontaneously. Preferably, persistent atrial fibrillation requires electrical or pharmacological cardioversion for termination, or other procedures, such as ablation procedures (Fuster V. et al., Circulation 2006; 114 (7): e257-354). Both persistent and paroxysmal AF may be recurrent, whereby distinction of paroxysmal and persistent AF is provided by ECG recordings: When a patient has had 2 or more episodes, AF is considered recurrent. If the arrhythmia terminates spontaneously, AF, in particular recurrent AF, is designated paroxysmal. AF is designated persistent if it lasts more than 7 days.

In a preferred embodiment of the present invention, the term "paroxysmal atrial fibrillation" is defined as episodes of AF that terminate spontaneously, wherein said episodes last less than 24 hours. In an alternative embodiment, the episodes which terminate spontaneously last up to seven days.

The "subject" as referred to herein is, preferably, a mammal. Mammals include, but are not limited to, domesticated animals (e.g., cows, sheep, cats, dogs, and horses), primates (e.g., humans and non-human primates such as monkeys), rabbits, and rodents (e.g., mice and rats). Preferably, the subject is a human subject.

Preferably, the subject to be tested is of any age, more preferably, the subject to be tested is 50 years of age or older, more preferably 60 years of age or older, and most preferably 65 years of age or older. Further, it is envisaged that the subject to be tested is 70 years of age or older.

Moreover, it is envisaged that the subject to be tested is 75 years of age or older. Also, the subject may be between 50 and 90 years.

In a preferred embodiment of the method of assessing atrial fibrillation, the subject to be tested shall suffer from atrial fibrillation. Accordingly, the subject shall have a known history of atrial fibrillation. Thus, the subject shall have experienced episodes of Atrial Fibrillation prior to obtaining the test sample, and at least one of the previous episodes of atrial fibrillation shall have been diagnosed, e.g. by ECG. For example, it is envisaged that the subject suffers from atrial fibrillation, if the assessment of atrial fibrillation is the differentiation between paroxysmal and persistent atrial fibrillation, or if the assessment of atrial fibrillation is the prediction of a risk of an adverse event associated with atrial fibrillation, or if the assessment of atrial fibrillation is the assessment of a therapy for atrial fibrillation.

In another preferred embodiment of the method of assessing atrial fibrillation, the subject to be tested is suspected to suffer from atrial fibrillation, e.g. if the assessment of atrial fibrillation is the diagnosis of atrial fibrillation or the identification of a subject who shall be subjected to electrocardiography (ECG).

Preferably, a subject who is suspected to suffer from atrial fibrillation is a subject who has shown at least one symptom of atrial fibrillation prior to carrying out the method for assessing atrial fibrillation. Said symptoms are usually transient and may arise in a few seconds and may disappear just as quickly. Symptoms of atrial fibrillation include dizziness, fainting, shortness of breath and, in particular, heart palpitations. Preferably, the subject has shown at least one symptom of atrial fibrillation within six months prior to obtaining the sample.

Alternatively or additionally, a subject who is suspected to suffer from atrial fibrillation shall be a subject who is 70 years of age or older.

Preferably, the subject who is suspected to suffer from atrial fibrillation shall have no known history of atrial fibrillation.

In accordance with the present invention, a subject having no known history of atrial fibrillation is, preferably, a subject who has not been diagnosed to suffer from atrial fibrillation previously, i.e. before carrying out the method of the present invention (in particular before obtaining the sample from the subject). However, the subject may or may not have had previous undiagnosed episodes of atrial fibrillation.

Preferably, the term "atrial fibrillation" refers to all types of atrial fibrillation. Accordingly, the term preferably encompasses paroxysmal, persistent or permanent atrial fibrillation. In an embodiment of the present invention, however, the subject to be tested does not suffer from permanent atrial fibrillation. Thus, it is preferred that the term "atrial fibrillation" only refers to paroxysmal and persistent atrial fibrillation.

As set forth above, the biomarker ESM-1 could be increased in various diseases and disorders other than atrial fibrillation. In an embodiment of the present invention, it is envisaged that the subject does not suffer from such diseases and disorders. For example, it is envisaged that the subject shall not suffer from chronic kidney disease, diabetes, cancer, coronary artery disease, hypertension, and/or kidney failure requiring dialysis. In an embodiment, it is envisaged that the subject does not have a history of stroke.

In an embodiment of the assessment of atrial fibrillation, the subject to be tested in accordance with the method of assessing atrial fibrillation does not suffer from heart failure. The term "heart failure" is defined in connection with the method of diagnosing heart failure. The definition applies accordingly.

In an alternative embodiment of the assessment of atrial fibrillation, the subject may suffer or is suffering from heart failure.

The subject to be tested may or may not experience episodes of atrial fibrillation when the sample is obtained. Thus, in a preferred embodiment of the assessment of atrial fibrillation (such as in the diagnosis of atrial fibrillation), the subject does not experience episodes of Atrial Fibrillation when the sample is obtained. In this embodiment, the subject shall have a normal sinus rhythm when the sample is obtained (and shall be accordingly in sinus rhythm). Thus, the diagnosis of atrial fibrillation is possible even in the (temporary) absence of atrial fibrillation. In accordance with the method of the present invention, the elevation of endocan should be preserved after the episode of Atrial Fibrillation and, thus, provide a diagnosis of a subject who has suffered from Atrial Fibrillation. Preferably, the diagnosis of AF within about three days, within about one month, within about three months, or within about 6 months after carrying out the method of the present invention (or to be more precise after the sample has been obtained). In a preferred embodiment, the diagnosis of Atrial Fibrillation within about six months after the episode is feasible. In a preferred embodiment, the diagnosis of Atrial Fibrillation within about six months after the episode is feasible. Accordingly, the assessment of atrial fibrillation as referred to herein, in particular the diagnosis, the prediction of the risk or the differentiation as referred to herein in connection with the assessment of atrial fibrillation is preferably carried out after about three days, more preferably after about one month, even more preferably after about three month, and most preferably after about six months after the last episode of atrial fibrillation. Consequently, is envisaged that is sample to be tested is preferably obtained after about three days, more preferably after about one month, even more preferably after about three month, and most preferably after about six months after the last episode of atrial fibrillation. Accordingly, the diagnosis of atrial fibrillation preferably also encompasses the diagnosis of episodes of atrial fibrillation that occurred preferably within about three days, more preferably within about three months, and most preferably within about six months before the sample was obtained.

However, it is also envisaged that the subject experiences episodes of atrial fibrillation when the sample is obtained (e.g. with respect to the prediction of stroke).

The method of the present invention can be also used for the screening of larger populations of subjects. Therefore, it is envisaged, that at least 100 subjects, in particular at least 1000 subjects are assessed with respect to atrial fibrillation. Thus, the amount of the biomarker is determined in samples from at least 100, or in particular of from at least 1000 subjects. Moreover, it is envisaged that at least 10.000 subjects are assessed.

The term "sample" refers to a sample of a body fluid, to a sample of separated cells or to a sample from a tissue or an organ. Samples of body fluids can be obtained by well-known techniques and include, samples of blood, plasma, serum, urine, lymphatic fluid, sputum, ascites, or any other bodily secretion or derivative thereof. Tissue or organ samples may be obtained from any tissue or organ by, e.g., biopsy. Separated cells may be obtained from the body fluids or the tissues or organs by separating techniques such as centrifugation or cell sorting. E.g., cell-, tissue- or organ samples may be obtained from those cells, tissues or organs which express or produce the biomarker. The sample may be frozen, fresh, fixed (e.g. formalin fixed), centrifuged, and/or embedded (e.g. paraffin embedded), etc. The cell sample can, of course, be subjected to a variety of well-known post-collection preparative and storage techniques (e.g., nucleic acid and/or protein extraction, fixation, storage, freezing, ultrafiltration, concentration, evaporation, centrifugation, etc.) prior to assessing the amount of the biomarker(s) in the sample.

In a preferred embodiment of the present invention, the sample is a blood (i.e. whole blood), serum or plasma sample. Serum is the liquid fraction of whole blood that is obtained after the blood is allowed to clot. For obtaining the serum, the clot is removed by centrifugation and the supernatant is collected. Plasma is the acellular fluid portion of blood. For obtaining a plasma sample, whole blood is collected in anticoagulant-treated tubes (e.g. citrate-treated or EDTA-treated tubes). Cells are removed from the sample by centrifugation and the supernatant (i.e. the plasma sample) is obtained.

As set forth above, the subject may be in sinus rhythm or may suffer from an episode of AF rhythm at the time at which the sample is obtained.

The biomarker endothelial cell specific molecule 1 (abbreviated ESM-1) is well known in the art. The biomarker is frequently also referred to as endocan. ESM-1 is a secreted protein which is mainly expressed in the endothelial cells in human lung and kidney tissues. Public domain data suggest expression also in thyroid, lung and kidney, but also in heart tissue, see. e.g. the entry for ESM-1 in the Protein Atlas database (Uhlén M. et al., Science 2015; 347(6220): 1260419). The expression of this gene is regulated by cytokines. ESM-1 is a proteoglycan composed of a 20 kDa mature polypeptide and a 30 kDa O-linked glycan chain (Bechard D et al., J Biol Chem 2001; 276(51):48341-48349).

In a preferred embodiment of the present invention, the amount of the human ESM-1 polypeptide is determined in a sample from the subject. The sequence of the human ESM-1 polypeptide is well known in the art (see e.g. Lassale P. et al., J. Biol. Chem. 1996; 271:20458-20464 and can be e.g. assessed via Uniprot database, see entry Q9NQ30 (ESM-1_HUMAN). Two isoforms of ESM-1 are produced by alternative splicing, isoform 1 (having the Uniprot identifier Q9NQ30-1) and isoform 2 (having the Uniprot identifier Q9NQ30-2). Isoform 1 has length of 184 amino acids. In isoform 2, amino acids 101 to 150 of isoform 1 are missing. Amino acids 1 to 19 form the signal peptide (which might be cleaved off).

In a preferred embodiment, the amount of isoform 1 of the ESM-1 polypeptide is determined, i.e. isoform 1 having a sequence as shown under UniProt accession number Q9NQ30-1.

In another preferred embodiment, the amount of isoform 2 of the ESM-1 polypeptide is determined, i.e. isoform 2 having a sequence as shown under UniProt accession number Q9NQ30-2.

In another preferred embodiment, the amount of isoform-1 and isoform 2 of the ESM-1 polypeptide is determined, i.e. total ESM-1.

For example, the amount of ESM-1 could be determined with a monoclonal antibody (such as a mouse antibody) against amino acids 85 to 184 of the ESM-1 polypeptide and/or with a goat polyclonal antibody.

The term "natriuretic peptide" comprises atrial natriuretic peptide (ANP)-type and brain natriuretic peptide (BNP)-type peptides. Thus, natriuretic peptides according to the present invention comprise ANP-type and BNP-type peptides and variants thereof (see, e.g., Bonow RO. et al., Circulation 1996; 93: 1946-1950).

ANP-type peptides comprise pre-proANP, proANP, NT-proANP, and ANP.

BNP-type peptides comprise pre-proBNP, proBNP, NT-proBNP, and BNP.

The pre-pro peptide (134 amino acids in the case of pre-proBNP) comprises a short signal peptide, which is enzymatically cleaved off to release the pro peptide (108 amino acids in the case of proBNP). The pro peptide is further cleaved into an N-terminal pro peptide (NT-pro peptide, 76 amino acids in case of NT-proBNP) and the active hormone (32 amino acids in the case of BNP, 28 amino acids in the case of ANP).

Preferred natriuretic peptides according to the present invention are NT-proANP, ANP, NT-proBNP, BNP. ANP and BNP are the active hormones and have a shorter half-life than their respective inactive counterparts, NT-proANP and NT-proBNP. BNP is metabolized in the blood, whereas NT-proBNP circulates in the blood as an intact molecule and as such is eliminated renally.

Preanalytics are more robust with NT-proBNP, allowing easy transportation of the sample to a central laboratory (Mueller T, Gegenhuber A, Dieplinger B, Poelz W, Haltmayer M. Long-term stability of endogenous B-type natriuretic peptide (BNP) and amino terminal proBNP (NT-proBNP) in frozen plasma samples. Clin Chem Lab Med 2004; 42: 942-4.). Blood samples can be stored at room temperature for several days or may be mailed or shipped without recovery loss. In contrast, storage of BNP for 48 hours at room temperature or at 4° C. leads to a concentration loss of at least 20% (Mueller T, Gegenhuber A, et al., Clin Chem Lab Med 2004; 42: 942-4; Wu A H, Packer M, Smith A, Bijou R, Fink D, Mair J, Wallentin L, Johnston N, Feldcamp C S, Haverstick D M, Ahnadi C E, Grant A, Despres N, Bluestein B, Ghani F Analytical and clinical evaluation of the Bayer ADVIA Centaur automated B-type natriuretic peptide assay in patients with heart failure: a multisite study. Clin Chem 2004; 50: 867-73.). Therefore, depending on the time-course or properties of interest, either measurement of the active or the inactive forms of the natriuretic peptide can be advantageous.

The most preferred natriuretic peptides according to the present invention are NT-proBNP and BNP, in particular NT-proBNP. As briefly discussed above, the human NT-proBNP as referred to in accordance with the present invention is a polypeptide comprising, preferably, 76 amino acids in length corresponding to the N-terminal portion of the human NT-proBNP molecule. The structure of the human BNP and NT-proBNP has been described already in detail in the prior art, e.g., WO 02/089657, WO 02/083913, and Bonow R O. et al., New Insights into the cardiac natriuretic peptides. Circulation 1996; 93: 1946-1950. Preferably, human NT-proBNP as used herein is human NT-proBNP as disclosed in EP 0 648 228 B 1.

The term "determining" the amount of a biomarker as referred to herein (such as ESM-1 or the natriuretic peptide) refers to the quantification of the biomarker, e.g. to measuring the level of the biomarker in the sample, employing appropriate methods of detection described elsewhere herein. The terms "measuring" and "determining" are used herein interchangeably.

In an embodiment, the amount of a biomarker is determined by contacting the sample with an agent that specifically binds to the biomarker, thereby forming a complex between the agent and said biomarker, detecting the amount of complex formed, and thereby measuring the amount of said biomarker.

The biomarkers as referred to herein (such as ESM-1) can be detected using methods generally known in the art. Methods of detection generally encompass methods to quantify the amount of a biomarker in the sample (quantitative method). It is generally known to the skilled artisan which of the following methods are suitable for qualitative and/or for quantitative detection of a biomarker. Samples can be conveniently assayed for, e.g., proteins using Westerns and immunoassays, like ELISAs, RIAs, fluorescence- and luminescence-based immunoassays and proximity extension assays, which are commercially available. Further suitable methods to detect biomarkers include measuring a physical or chemical property specific for the peptide or polypeptide such as its precise molecular mass or NMR spectrum. Said methods comprise, e.g., biosensors, optical devices coupled to immunoassays, biochips, analytical devices such as mass-spectrometers, NMR-analyzers, or chromatography devices. Further, methods include microplate ELISA-based methods, fully-automated or robotic immunoassays (available for example on Elecsys™ analyzers), CBA (an enzymatic Cobalt Binding Assay, available for example on Roche-Hitachi™ analyzers), and latex agglutination assays (available for example on Roche-Hitachi™ analyzers).

For the detection of biomarker proteins as referred to herein a wide range of immunoassay techniques using such an assay format are available, see, e.g., U.S. Pat. Nos. 4,016,043, 4,424,279, and 4,018,653. These include both single-site and two-site or "sandwich" assays of the non-competitive types, as well as in the traditional competitive binding assays. These assays also include direct binding of a labeled antibody to a target biomarker.

Methods employing electrochemiluminescent labels are well-known. Such methods make use of the ability of special metal complexes to achieve, by means of oxidation, an excited state from which they decay to ground state, emitting electrochemiluminescence. For review see Richter, M. M., Chem. Rev. 2004; 104: 3003-3036.

In an embodiment, the detection antibody (or an antigen-binding fragment thereof) to be used for measuring the amount of a biomarker is ruthenylated or iridinylated. Accordingly, the antibody (or an antigen-binding fragment thereof) shall comprise a ruthenium label. In an embodiment, said ruthenium label is a bipyridine-ruthenium(II) complex. Or the antibody (or an antigen-binding fragment thereof) shall comprise an iridium label. In an embodiment, said iridium label is a complex as disclosed in WO 2012/107419.

In an embodiment of the sandwich assay for the determination of ESM-1, the assay comprises a biotinylated first monoclonal antibody that specifically binds ESM-1 (as capture antibody) and a ruthenylated F(ab')2-fragment of a second monoclonal antibody that specifically binds ESM-1 as detection antibody). The two antibodies form sandwich immunoassay complexes with ESM-1 in the sample.

In an embodiment of the sandwich assay for the determination of the natriuretic peptide, the assay comprises a biotinylated first monoclonal antibody that specifically binds the natriuretic peptide (as capture antibody) and a ruthenylated F(ab')2-fragment of a second monoclonal antibody that specifically binds the natriuretic peptide as detection antibody). The two antibodies form sandwich immunoassay complexes with the natriuretic peptide in the sample.

Measuring the amount of a polypeptide (such as ESM-1 or the natriuretic peptide) may, preferably, comprise the steps of (a) contacting the polypeptide with an agent that specifically binds said polypeptide, (b) (optionally) removing non-bound agent, (c) measuring the amount of bound binding agent, i.e. the complex of the agent formed in step (a). According to a preferred embodiment, said steps of contacting, removing and measuring may be performed by an analyzer unit. According to some embodiments, said steps may be performed by a single analyzer unit of said system or by more than one analyzer unit in operable communication with each other. For example, according to a specific embodiment, said system disclosed herein may include a first analyzer unit for performing said steps of contacting and removing and a second analyzer unit, operably connected to said first analyzer unit by a transport unit (for example, a robotic arm), which performs said step of measuring.

The agent which specifically binds the biomarker (herein also referred to as "binding agent") may be coupled covalently or non-covalently to a label allowing detection and measurement of the bound agent. Labeling may be done by direct or indirect methods. Direct labeling involves coupling of the label directly (covalently or non-covalently) to the binding agent. Indirect labeling involves binding (covalently or non-covalently) of a secondary binding agent to the first binding agent. The secondary binding agent should specifically bind to the first binding agent. Said secondary binding agent may be coupled with a suitable label and/or be the target (receptor) of a tertiary binding agent binding to the secondary binding agent. Suitable secondary and higher order binding agents may include antibodies, secondary antibodies, and the well-known streptavidin-biotin system (Vector Laboratories, Inc.). The binding agent or substrate may also be "tagged" with one or more tags as known in the art. Such tags may then be targets for higher order binding agents. Suitable tags include biotin, digoxygenin, His-Tag, Glutathion-S-Transferase, FLAG, GFP, myc-tag, influenza A virus haemagglutinin (HA), maltose binding protein, and the like. In the case of a peptide or polypeptide, the tag is preferably at the N-terminus and/or C-terminus. Suitable labels are any labels detectable by an appropriate detection method. Typical labels include gold particles, latex beads, acridan ester, luminol, ruthenium complexes, iridium complexes, enzymatically active labels, radioactive labels, magnetic labels ("e.g. magnetic beads", including paramagnetic and superparamagnetic labels), and fluorescent labels. Enzymatically active labels include e.g. horseradish peroxidase, alkaline phosphatase, beta-Galactosidase, Luciferase, and derivatives thereof. Suitable substrates for detection include di-amino-benzidine (DAB), 3,3'-5,5'-tetramethylbenzidine, NBT-BCIP (4-nitro blue tetrazolium chloride and 5-bromo-4-chloro-3-indolyl-phosphate, avail-able as ready-made stock solution from Roche Diagnostics), CDP-Star™ (Amersham Bio-sciences), ECF™ (Amersham Biosciences). A suitable enzyme-substrate combination may result in a colored reaction product, fluorescence or chemoluminescence, which can be determined according to methods known in the art (e.g. using a light-sensitive film or a suit-able camera system). As for measuring the enzymatic reaction, the criteria given above apply analogously. Typical fluorescent labels include fluorescent proteins (such as GFP and its derivatives), Cy3, Cy5, Texas Red, Fluorescein, and the Alexa dyes (e.g. Alexa 568). Further fluorescent labels are available e.g. from Molecular Probes (Oregon). Also the use of quantum dots as fluorescent labels is contemplated. A radioactive label can be detected by any method known and appropriate, e.g. a light-sensitive film or a phosphor imager.

The amount of a polypeptide may be, also preferably, determined as follows: (a) contacting a solid support comprising a binding agent for the polypeptide as described elsewhere herein with a sample comprising the peptide or polypeptide and (b) measuring the amount of peptide or poly-peptide which is bound to the support. Materials for manufacturing supports are well-known in the art and include, inter alia, commercially available column materials, polystyrene beads, latex beads, magnetic beads, colloid metal particles, glass and/or silicon chips and surfaces, nitrocellulose strips, membranes, sheets, duracytes, wells and walls of reaction trays, plastic tubes etc.

In yet an aspect the sample is removed from the complex formed between the binding agent and the at least one marker prior to the measurement of the amount of formed complex. Accordingly, in an aspect, the binding agent may be immobilized on a solid support. In yet an aspect, the sample can be removed from the formed complex on the solid support by applying a washing solution.

"Sandwich assays" are among the most useful and commonly used assays encompassing a number of variations of the sandwich assay technique. Briefly, in a typical assay, an unlabeled (capture) binding agent is immobilized or can be immobilized on a solid substrate, and the sample to be tested is brought into contact with the capture binding agent. After a suitable period of incubation, for a period of time sufficient to allow formation of a binding agent-biomarker complex, a second (detection) binding agent labeled with a reporter molecule capable of producing a detectable signal is then added and incubated, allowing time sufficient for the formation of another complex of binding agent-biomarker-labeled binding agent. Any unreacted material may be washed away, and the presence of the biomarker is determined by observation of a signal produced by the reporter molecule bound to the detection binding agent. The results may either be qualitative, by simple observation of a visible signal, or may be quantitated by comparison with a control sample containing known amounts of biomarker.

The incubation steps of a typical sandwich assays can be varied as required and appropriate. Such variations include for example simultaneous incubations, in which two or more of binding agent and biomarker are co-incubated. For example, both, the sample to be analyzed and a labeled binding agent are added simultaneously to an immobilized capture binding agent. It is also possible to first incubate the sample to be analyzed and a labeled binding agent and to thereafter add an antibody bound to a solid phase or capable of binding to a solid phase.

The formed complex between a specific binding agent and the biomarker shall be proportional to the amount of the biomarker present in the sample. It will be understood that the specificity and/or sensitivity of the binding agent to be applied defines the degree of proportion of at least one marker comprised in the sample which is capable of being specifically bound. Further details on how the measurement can be carried out are also found elsewhere herein. The amount of formed complex shall be transformed into an amount of the biomarker reflecting the amount indeed present in the sample.

The terms "binding agent", "specific binding agent", "analyte-specific binding agent", "detection agent" and "agent that specifically binds to a biomarker" are used interchangeably herein. Preferably it relates to an agent that comprises a binding moiety which specifically binds the corresponding biomarker. Examples of "binding agents", "detection agents", "agents" are a nucleic acid probe, nucleic acid primer, DNA molecule, RNA molecule, aptamer, antibody, antibody fragment, peptide, peptide nucleic acid (PNA) or chemical compound. A preferred agent is an antibody which specifically binds to the biomarker to be determined. The term "antibody" herein is used in the broadest sense and encompasses various antibody structures, including but not limited to monoclonal antibodies, polyclonal antibodies, multispecific antibodies (e.g., bispecific antibodies), and antibody fragments so long as they exhibit the desired antigen-binding activity (i.e. antigen-binding fragments thereof). Preferably, the antibody is a polyclonal antibody (or an antigen-binding fragment therefrom). More preferably, the antibody is a monoclonal antibody (or an antigen binding fragment therefore Moreover, as described elsewhere herein, it is envisaged that two monoclonal antibodies are used that bind at different positions of ESM-1 (in a sandwich immunoassay). Thus, at least one antibody is used for the determination of the amount of ESM-1.

In an embodiment, the at least one antibody is a mouse monoclonal antibody. In another embodiment, the at least one antibody is a rabbit monoclonal antibody. In a further embodiment, the antibody is goat polyclonal antibody. In an even further embodiment, the antibody is a sheep polyclonal antibody.

The term "specific binding" or "specifically bind" refers to a binding reaction wherein binding pair molecules exhibit a binding to each other under conditions where they do not significantly bind to other molecules. The term "specific binding" or "specifically binds", when referring to a protein or peptide as biomarker, preferably refers to a binding reaction wherein a binding agent binds to the corresponding biomarker with an affinity ("association constant" $K_a$) of at least $10^7$ $M^{-1}$. The term "specific binding" or "specifically binds" preferably refers to an affinity of at least $10^8$ $M^{-1}$ or even more preferred of at least $10^9$ $M^{-1}$ for its target molecule. The term "specific" or "specifically" is used to indicate that other molecules present in the sample do not significantly bind to the binding agent specific for the target molecule.

In one embodiment, the method of the present invention is based on detecting a protein complex comprising human ESM-1 and a non-human or chimeric ESM-1-specific binding agent. In such embodiment the present invention reads on a method for assessing atrial fibrillation in a subject, said method comprising the steps of (a) incubating a sample from said subject with a non-human ESM-1-specific binding agent (b) measuring the complex between the ESM-1-specific binding agent and ESM-1 formed in (a), and (c) comparing the measured amount complex to a reference amount. An amount of the complex at or above the reference amount is indicative for the diagnosis (and thus the presence) of atrial fibrillation, the presence of persistent atrial fibrillation, a subject who shall be subjected to ECG, or a subject who is at risk of an adverse event. An amount of the complex below the reference amount is indicative for the absence of atrial fibrillation, the presence of paroxysmal atrial fibrillation, a subject who is shall be not subjected to ECG, or a subject who is not at risk of an adverse event.

The term "amount" as used herein encompasses the absolute amount of a biomarker as referred to herein (such as ESM-1 or the natriuretic peptide), the relative amount or concentration of the said biomarker as well as any value or parameter which correlates thereto or can be derived therefrom. Such values or parameters comprise intensity signal values from all specific physical or chemical properties obtained from the said peptides by direct measurements, e.g., intensity values in mass spectra or NMR spectra.

Moreover, encompassed are all values or parameters which are obtained by indirect measurements specified elsewhere in this description, e.g., response amounts determined from biological read out systems in response to the peptides or intensity signals obtained from specifically bound ligands. It is to be understood that values correlating to the aforementioned amounts or parameters can also be obtained by all standard mathematical operations.

The term "comparing" as used herein refers to comparing the amount of the biomarker (such as ESM-1 and the natriuretic peptide such as NT-proBNP or BNP) in the sample from the subject with the reference amount of the biomarker specified elsewhere in this description. It is to be understood that comparing as used herein usually refers to a comparison of corresponding parameters or values, e.g., an absolute amount is compared to an absolute reference amount while a concentration is compared to a reference concentration or an intensity signal obtained from the biomarker in a sample is compared to the same type of intensity signal obtained from a reference sample. The comparison may be carried out manually or computer-assisted. Thus, the comparison may be carried out by a computing device. The value of the determined or detected amount of the biomarker in the sample from the subject and the reference amount can be, e.g., compared to each other and the said comparison can be automatically carried out by a computer program executing an algorithm for the comparison. The computer program carrying out the said evaluation will provide the desired assessment in a suitable output format. For a computer-assisted comparison, the value of the determined amount may be compared to values corresponding to suitable references which are stored in a database by a computer program. The computer program may further evaluate the result of the comparison, i.e. automatically provide the desired assessment in a suitable output format. For a computer-assisted comparison, the value of the determined amount may be compared to values corresponding to suitable references which are stored in a database by a computer program. The computer program may further evaluate the result of the comparison, i.e. automatically provides the desired assessment in a suitable output format.

In accordance with the present invention, the amount of the biomarker ESM-1 and optionally the amount of the natriuretic peptide shall be compared to a reference. The reference is preferably a reference amount. The term "reference amount" is well understood by the skilled person. It is to be understood that the reference amount shall allow for the herein described assessment of atrial fibrillation. E.g., in connection with the method for diagnosing atrial fibrillation, the reference amount preferably refers to an amount which allows for allocation of a subject into either (i) the group of subjects suffering from atrial fibrillation or (ii) the group of subjects not suffering from atrial fibrillation. A suitable reference amount may be determined from a reference sample to be analyzed together, i.e. simultaneously or subsequently, with the test sample.

It is to be understood that the amount of ESM-1 is compared to a reference amount for ESM-1, whereas the amount of the natriuretic peptide is compared to a reference amount of the natriuretic peptide. If the amounts of two markers are determined, it is also envisaged that a combined score is calculated based on the amounts of ESM-1 and the natriuretic peptide. In a subsequent step, the score is compared to a reference score.

Reference amounts can, in principle, be calculated for a cohort of subjects as specified above based on the average or mean values for a given biomarker by applying standard methods of statistics. In particular, accuracy of a test such as a method aiming to diagnose an event, or not, is best described by its receiver-operating characteristics (ROC) (see especially Zweig M H. et al., Clin. Chem. 1993; 39:561-577). The ROC graph is a plot of all the sensitivity versus specificity pairs resulting from continuously varying the decision threshold over the entire range of data observed. The clinical performance of a diagnostic method depends on its accuracy, i.e. its ability to correctly allocate subjects to a certain prognosis or diagnosis. The ROC plot indicates the overlap between the two distributions by plotting the sensitivity versus 1—specificity for the complete range of thresholds suitable for making a distinction. On the y-axis is sensitivity, or the true-positive fraction, which is defined as the ratio of number of true-positive test results to the product of number of true-positive and number of false-negative test results. It is calculated solely from the affected subgroup. On the x-axis is the false-positive fraction, or 1—specificity, which is defined as the ratio of number of false-positive results to the product of number of true-negative and number of false-positive results. It is an index of specificity and is calculated entirely from the unaffected subgroup. Because the true- and false-positive fractions are calculated entirely separately, by using the test results from two different subgroups, the ROC plot is independent of the prevalence of the event in the cohort. Each point on the ROC plot represents a sensitivity/1—specificity pair corresponding to a particular decision threshold. A test with perfect discrimination (no overlap in the two distributions of results) has an ROC plot that passes through the upper left corner, where the true-positive fraction is 1.0, or 100% (perfect sensitivity), and the false-positive fraction is 0 (perfect specificity). The theoretical plot for a test with no discrimination (identical distributions of results for the two groups) is a 45° diagonal line from the lower left corner to the upper right corner. Most plots fall in between these two extremes. If the ROC plot falls completely below the 45° diagonal, this is easily remedied by reversing the criterion for "positivity" from "greater than" to "less than" or vice versa. Qualitatively, the closer the plot is to the upper left corner, the higher the overall accuracy of the test. Dependent on a desired confidence interval, a threshold can be derived from the ROC curve allowing for the diagnosis for a given event with a proper balance of sensitivity and specificity, respectively. Accordingly, the reference to be used for the method of the present invention, i.e. a threshold which allows to assess atrial fibrillation can be generated, preferably, by establishing a ROC for said cohort as described above and deriving a threshold amount therefrom. Dependent on a desired sensitivity and specificity for a diagnostic method, the ROC plot allows deriving a suitable threshold. It will be understood that an optimal sensitivity is desired for e.g. excluding a subject from suffering from atrial fibrillation (i.e. a rule out) whereas an optimal specificity is envisaged for a subject to be assessed as suffering from atrial fibrillation (i.e. a rule in). In an embodiment, the method of the present invention allows for the prediction that a subject is at risk of an adverse event associated with atrial fibrillation such as the occurrence or recurrence of Atrial Fibrillation and/or stroke.

In a preferred embodiment, the term "reference amount" herein refers to a predetermined value. Said predetermined value shall allow for assessing atrial fibrillation, and thus for diagnosing atrial fibrillation, for differentiating between paroxysmal and persistent atrial fibrillation, for prediction the risk of an adverse event associated with atrial fibrillation, for identifying a subject who shall be subjected to electrocardiography (ECG), or for the assessment of a therapy for atrial fibrillation. It is to be understood that the reference amount may differ based on the type of assessment. E.g., the reference amount for ESM-1 for the differentiation of AF will be usually higher than the reference amount for the diagnosis of AF. However, this will be taken into account by the skilled person.

As set forth above, the term "assessing atrial fibrillation" preferably refers to the diagnosis of atrial fibrillation, the differentiation between paroxysmal and persistent atrial fibrillation, the prediction of a risk of an adverse event associated with atrial fibrillation, to the identification of a subject who shall be subjected to electrocardiography (ECG), or the assessment of a therapy for atrial fibrillation. In the following, these embodiments of the method of the present invention will be described in more detail. The definitions above apply accordingly.

Method for Diagnosing Atrial Fibrillation

The term "diagnosing" as used herein means assessing whether a subject as referred to in accordance with the method of the present invention suffers from atrial fibrillation (AF), or not. In an embodiment, it is diagnosed that a subject suffers from AF. In a preferred embodiment, it is diagnosed that a subject suffers from paroxysmal AF. In an alternative embodiment, it is diagnosed that a subject does not suffer from AF.

In accordance with the present invention, all types of AF can be diagnosed. Thus, the atrial fibrillation may be paroxysmal, persistent or permanent AF. Preferably, the parxoxysmal or atrial fibrillation are diagnosed, in particular in a subject not suffering from permanent AF.

The actual diagnosis whether a subject suffers from AF, or not may comprise further steps such as the confirmation of a diagnosis (e.g. by ECG such as Holter-ECG). Thus, the present invention allows for assessing the likelihood that a patient suffers from atrial fibrillation. A subject who has an amount of ESM-1 above the reference amount is likely to suffer from atrial fibrillation, whereas a subject who has an amount of ESM-1 below the reference amount is not likely to suffer from atrial fibrillation. Accordingly, the term "diagnosing" in the context of the present invention also encompasses aiding the physician to assess whether a subject suffers from atrial fibrillation, or not.

Preferably, an amount of ESM-1 (and optionally an amount of the natriuretic peptide) in the sample from a test subject which is (are) increased as compared to the reference amount (or to the reference amounts) is indicative for a subject suffering from atrial fibrillation, and/or an amount of ESM-1 (and optionally an amount of the natriuretic peptide) in the sample from a subject which is (are) decreased as compared to the reference amount (or the reference amounts) is indicative for a subject not suffering from atrial fibrillation.

In a preferred embodiment, the reference amount, i.e. the reference amount ESM-1 and, if a natriuretic peptide is determined, the reference amount for the natriuretic peptide, shall allow for differentiating between a subject suffering from atrial fibrillation and a subject not suffering from atrial fibrillation. Preferably, said reference amount is a predetermined value.

In an embodiment, the method of the present invention allows for the diagnosis of a subject suffering from atrial fibrillation. Preferably, the subject is suffering from AF, if the amount of ESM-1 (and optionally the amount of the natriuretic peptide) is (are) above the reference amount. In an embodiment, the subject is suffering from AF, if the amount of ESM-1 is above a certain percentile (e.g. 99th percentile) upper reference limit (URL) of a reference amount.

In another preferred embodiment, the method of the present invention allows for the diagnosis that a subject is not suffering from atrial fibrillation. Preferably, the subject is not suffering from AF, if the amount of ESM-1 (and optionally an amount of the natriuretic peptide) is (are) below the reference amount (such as the certain percentile URL). Thus, in an embodiment, the term "diagnosing atrial fibrillation" refers to "ruling out atrial fibrillation".

Ruling-out out atrial fibrillation is of particular interest since further diagnostic tests for the diagnosis of atrial fibrillation such as an ECG test can be avoided. Thus, thanks to the present invention, unnecessary health care costs can be avoided.

Accordingly, the present invention also concerns a method for ruling out atrial fibrillation, comprising the steps of a) determining the amount of ESM-1 in a sample from the subject, and b) comparing the amount of ESM-1 to a reference amount whereby atrial fibrillation is ruled out.

Preferably, an amount of a the biomarker ESM-1 in the sample of the subject which is decreased as compared to the reference amount (such as a reference for ruling out atrial fibrillation) is indicative for a subject who does not suffer from atrial fibrillation, and thus for ruling out atrial fibrillation in the subject. E.g. the reference amount for ESM-1 may be determined in a sample from a subject who does not suffer from AF, or a from samples of a group thereof.

When determining the biomarker ESM-1 and the natriuretic peptide in combination, an even more reliable rule-out can be achieved. Accordingly, steps a) and b) are preferably as follows:

a) determining the amount of ESM-1 and the amount of a natriuretic peptide in a sample from the subject, and b) comparing the amounts of ESM-1 and the natriuretic peptide to reference amounts whereby atrial fibrillation is ruled out.

Preferably, amounts of both biomarkers, i.e. the amount of the biomarker ESM-1 and the amount of the natriuretic peptide, in the sample of the subject which are decreased as compared to the respective reference amount (such as a reference amount for ruling out atrial fibrillation) are indicative for a subject who does not suffer from atrial fibrillation, and thus for ruling out atrial fibrillation in the subject. E.g. the reference amount for the natriuretic peptide may be determined in a sample from a subject who does not suffer from AF, or a from samples of a group thereof.

In an embodiment of the method of diagnosing atrial fibrillation, said method further comprises a step of recommending and/or initiating a therapy for atrial fibrillation based on the results of the diagnosis. Preferably, a therapy is recommended or initiated if it is diagnosed that the subject suffers from AF. Preferred therapies for atrial fibrillation are disclosed elsewhere herein.

Method for Differentiating Between Paroxysmal and Persistent Atrial Fibrillation The term "differentiating" as used herein means to distinguish between paroxysmal and persistent atrial fibrillation in a subject. The term as used herein, preferably, includes differentially diagnosing paroxysmal and persistent atrial fibrillation in a subject. Thus, the method of the present invention allows for assessing whether a subject with atrial fibrillation suffers from paroxysmal atrial fibrillation or persistent atrial fibrillation. The actual differentiation may comprise further steps such as the confirmation of the differentiation. Thus, the term "differentiation" in the context of the present invention also encompasses aiding the physician to differentiate between paroxysmal and persistent AF.

Preferably, an amount of ESM-1 (and optionally an amount of the natriuretic peptide) in the sample from a subject which is (are) increased as compared to the reference amount (or to the reference amounts) is indicative for a subject suffering from persistent atrial fibrillation and/or an amount of ESM-1 (and optionally an amount of the natriuretic peptide) in the sample from a subject which is (are) decreased as compared to a reference amount (or to the reference amounts) is indicative for a subject suffering from paroxysmal atrial fibrillation. In both AF types (paroxysmal and persistent), the amount of ESM-1 is increased as compared to the reference amount of non-AF subjects.

In a preferred embodiment, the reference amount(s) shall allow for differentiating between a subject suffering from paroxysmal atrial fibrillation and a subject suffering from persistent atrial fibrillation. Preferably, said reference amount is a predetermined value.

In an embodiment of the above method of differentiating between paroxysmal and persistent atrial fibrillation, the subject does not suffer from permanent atrial fibrillation.

Method for Predicting the Risk a Risk of an Adverse Event Associated with Atrial Fibrillation The method of the present invention also contemplates a method for predicting the risk of an adverse event.

In an embodiment, the risk of an adverse event as set forth herein can be the prediction of any adverse event associated with atrial fibrillation. Preferably, said adverse event is selected from recurrence of atrial fibrillation (such as the recurrence of atrial fibrillation after cardioversion) and stroke. Accordingly, the risk of a subject (who suffers from atrial fibrillation) to suffer in the future from an adverse event (such as stroke or recurrence of atrial fibrillation) shall be predicted.

Further, it is envisaged that said adverse event associated with atrial fibrillation is the occurrence of atrial fibrillation in a subject has no known history of atrial fibrillation.

In a particularly preferred embodiment, the risk of stroke is predicted.

Accordingly, the present invention method for predicting the risk of stroke in a subject, comprising the steps of
a) determining the amount of ESM-1 in a sample from the subject, and
b) comparing the amount of ESM-1 to a reference amount, whereby the risk of stroke is to be predicted.

Preferably, term "predicting the risk" as used herein refers to assessing the probability according to which the subject will suffer from an adverse event as referred to herein (e.g. of stroke). Typically, it is predicted whether a subject is at risk (and thus at elevated risk) or not at risk (and thus at reduced risk) of suffering from said adverse event. Accordingly, the method of the present invention allows for differentiating between a subject at risk and a subject not at risk of suffering from said adverse event. Further, it is envisaged that the method of the present invention allows for differentiating between a subject who is a reduced, average, or elevated risk.

As set forth above, the risk (and probability) of suffering from said adverse event within a certain time window shall be predicted. In a preferred embodiment of the present invention, the predictive window is a period of about three months, about six months, or about one year. In another preferred embodiment, the predictive window is a period of about five years (e.g. for the prediction of stroke). Further, the predictive window might be a period of about six years (e.g. for the prediction of stroke). Alternatively, the predictive window may be about 10 years. Also, it is envisaged that the predictive window a period of 1 to 10 years.

Preferably, said predictive window is calculated from the completion of the method of the present invention. More preferably, said predictive window is calculated from the time point at which the sample to be tested has been obtained. As will be understood by those skilled in the art, the prediction of a risk is usually not intended to be correct for 100% of the subjects. The term, however, requires that prediction can be made for a statistically significant portion of subjects in a proper and correct manner Whether a portion is statistically significant can be determined without further ado by the person skilled in the art using various well known statistic evaluation tools, e.g., determination of confidence intervals, p-value determination, Student's t-test, Mann-Whitney test etc. Details are found in Dowdy and Wearden, Statistics for Research, John Wiley & Sons, New York 1983. Preferred confidence intervals are at least 90%, at least 95%, at least 97%, at least 98%, or at least 99%. The p-values are, preferably, 0.1, 0.05, 0.01, 0.005, or 0.0001.

In a preferred embodiment, the expression "predicting the risk of suffering from said adverse event" means that the subject to be analyzed by the method of the present invention is allocated either into the group of subjects being at risk of suffering from said adverse event, or into the group of subjects not being at risk of suffering from said adverse event (such as stroke). Thus, it is predicted whether the subject is at risk or not at risk of suffering from said adverse event. As used herein "a subject who is at risk of suffering from said adverse event", preferably has an elevated risk of suffering from said adverse event (preferably within the predictive window). Preferably, said risk is elevated as compared to the average risk in a cohort of subjects. As used herein, "a subject who is not at risk of suffering from said adverse event", preferably, has a reduced risk of suffering from said adverse event (preferably within the predictive window). Preferably, said risk is reduced as compared to the average risk in a cohort of subjects. A subject who is at risk of suffering from said adverse event preferably has a risk of suffering from said adverse event such as recurrence or occurrence of atrial fibrillation of at least 20% or more preferably of at least 30%, preferably, within a predictive window of about one year. A subject who is not at risk of suffering from said adverse event preferably has a risk of lower than 12%, more preferably of lower than 10% of suffering from said adverse event, preferably within a predictive window of one year.

With respect to the prediction of stroke, a subject who is at risk of suffering from said adverse event preferably has a risk of suffering from said adverse event of at least 10% or more preferably of at least 13%, preferably, within a predictive window of about five years, or in particular of about six years. A subject who is not at risk of suffering from said adverse event preferably has a risk of lower than 10%, more preferably of lower than 8%, or most preferably of lower than 5% of suffering from said adverse event, preferably within a predictive window of about five years, or in particular of about six years. The risk may be higher, if the subject does not receive anticoagulation therapy. This will be taken into account by the skilled person.

Preferably, an amount of ESM-1 (and optionally an amount of the natriuretic peptide) in the sample from a subject which is (are) increased as compared to the reference amount (or to the reference amounts) is indicative for a subject who is at risk of the adverse event associated with atrial fibrillation. and/or an amount of ESM-1 (and optionally an amount of the natriuretic peptide) in the sample from a subject which is decreased as compared to the reference amount (or to the reference amounts) is indicative for a subject who is not at risk the adverse event associated with atrial fibrillation.

In a preferred embodiment, the reference amount shall allow for differentiating between a subject who is at risk of an adverse event as referred to herein and a subject who is not at risk of said adverse event. Preferably, said reference amount is a predetermined value.

In a preferred embodiment of the aforementioned method, the risk of stroke is predicted. Preferably, said stroke shall be associated with atrial fibrillation. More preferably, the stroke shall be caused by atrial fibrillation.

Preferably, a stroke is associated with atrial fibrillation, if there is a temporal relationship between the stroke and an episode of atrial fibrillation. More preferably, a stroke is associated with atrial fibrillation, if the stroke is caused by atrial fibrillation. Most preferably, a stroke is associated with atrial fibrillation, if the stroke can be caused by atrial fibrillation. For example, a cardioembolic stroke (frequently also referred to as embolic or thromboembolic stroke) can be caused by atrial fibrillation. Preferably, a stroke associated with AF can be prevented by oral anticoagulation.

The stroke to be predicted is thus preferably a cardioembolic stroke.

Also preferably, the stroke is considered as associated with atrial fibrillation, if the subject to be tested suffers from atrial fibrillation and/or has a known history thereof. Also, in an embodiment, the stroke may be considered as being associated with atrial fibrillation, if the subject is suspected to suffer from atrial fibrillation.

The terms "comparing", "amount", "subject", and "determining" etc. are defined elsewhere herein. The definitions apply accordingly. E.g. the sample is preferably a blood, serum or plasma sample.

In a preferred embodiment of the aforementioned method of predicting an adverse event (such as stroke), the subject to be tested suffers from atrial fibrillation. More preferably, the subject has a known history of atrial fibrillation. In accordance with the method for predicting an adverse event, the subject preferably suffers from permanent atrial fibrillation, more preferably from persistent atrial fibrillation and most preferably from paroxysmal atrial fibrillation.

In an embodiment of the method of predicting an adverse event, the subject suffering from atrial fibrillation experiences episodes of atrial fibrillation when the sample is obtained. In another embodiment of the method of predicting an adverse event, the subject suffering from atrial fibrillation does not experiences episode of atrial fibrillation when the sample is obtained (and thus shall have a normal sinus rhythm). Further, the subject whose risk is to be predicted may be on anticoagulation therapy.

In another embodiment of the method of predicting an adverse event, the subject to be tested has no known history of atrial fibrillation. In particular, it is envisaged that the subject does not suffer from atrial fibrillation.

In the studies underlying the present invention, it has been further shown that the determination of ESM-1 allows for improving the prediction accuracy of a clinical stroke risk score for a subject. Thus, the combined determination of clinical stroke risk score and the determination of ESM-1 allows for an even more reliable prediction of stroke as compared to the determination of ESM-1 or the determination of the clinical stroke risk score alone. (see Example 6).

Accordingly, the method for predicting the risk of stroke may further comprise the combination of the amount of ESM-1 with the clinical stroke risk score. Based on the combination of the amount of ESM-1 and the clinical risk score, the risk of stroke of the test subject is predicted.

In a embodiment of the aforementioned method, the method further comprises the comparison of the amount of ESM-1 with a reference amount. In this case, the results of the comparison is combined with the clinical stroke risk score.

Accordingly, the present invention, in particular, relates to method for predicting the risk of stroke in a subject, comprising the steps of
  a) determining the amount of ESM-1 in a sample from the subject, and
  b) combining the amount of ESM-1 with a clinical stroke risk score, whereby the risk of stroke of said subject is to be predicted.

In accordance with this method, it is envisaged that the subject is a subject who has a known clinical stroke risk score. Accordingly, the value for the clinical stroke risk score is known for the subject.

Alternatively, the method may comprise obtaining or providing the value for the clinical stroke risk score. Preferably, the value is a number. In an embodiment, the clinical stroke risk score is generated by one of the clinically based tools available to physicians. Preferably, the value provided by determining the value for the clinical stroke risk score for the subject. More preferably, the value is obtained from patient record databases and medical history of the subject. The value for the score therefore can be also determined using historical or published data of the subject.

In accordance with the present invention, the amount of ESM-1 is combined with the clinical stroke risk score. This means preferably, that the value for the amount of ESM-1 is combined with the clinical stroke risk score. Accordingly, the values are operatively combined to predict the risk of the subject to suffer from stroke. By combining the value, a single value may be calculated, which itself can be used for the prediction.

Clinical stroke risk scores are well known in the art. E.g. said scores are described in Kirchhof P. et al., (European Heart Journal 2016; 37: 2893-2962) which herewith is incorporated by references with respect to its entire disclosure content. In an embodiment, the score is $CHA_2DS_2$-VASc-Score. In another embodiment, the score is the $CHADS_2$ Score. (Gage BF. Et al., JAMA, 285 (22) (2001), pp. 2864-2870) and ABC score (Hijazi Z. et al., Lancet 2016; 387(10035): 2302-2311)

Method for Improving the Prediction Accuracy of a Clinical Stroke Risk Score

The present invention further relates to a method for improving the prediction accuracy of a clinical stroke risk score for a subject, comprising the steps of
  a) determining the amount of ESM-1 in a sample, and
  b) combining the amount of ESM-1 with the clinical stroke risk score, whereby the prediction accuracy of said clinical stroke risk score is improved.

The method may comprise the further step of c) improving prediction accuracy of said clinical stroke risk score based on the results of step b).

The definitions and explanations given herein above in connection with the method of assessing atrial fibrillation, in particular of predicting the risk of an adverse event (such as stroke) preferably apply to the aforementioned method as well E.g., it envisaged that the subject is a subject who has a known clinical stroke risk score. Alternatively, the method may comprise obtaining or providing the value for the clinical stroke risk score.

In accordance with the present invention, the amount of ESM-1 is combined with the clinical stroke risk score. This means preferably, that the value for the amount of ESM-1 is combined with the clinical stroke risk score. Accordingly, the values are operatively combined to improve the prediction accuracy of said clinical stroke risk score.

Method for Identifying a Subject Who Shall be Subjected to Electrocardiography (ECG)

In accordance with this embodiment of method of the present invention, it shall be assessed whether the subject to be tested with the biomarker shall be subjected to electrocardiography (ECG), i.e. to an electrocardiography assessment. Said assessment shall be carried for diagnosing, i.e. to detect the presence of absence of AF, in said subject.

The term "identifying a subject" as used herein preferably refers to using the information or data generated relating to the amount of ESM-1 in a sample of a subject to identify subject shall be subjected to ECG. The subject who is identified has an increased likelihood of suffering from AF. The ECG assessment is made as a confirmation.

Electrocardiography (abbreviated ECG) is the process of recording the electrical activity of the heart by suitable ECG. An ECG device records the electrical signals produced by the heart which spread throughout the body to the skin. The recording is of the electrical signal is achieved by contacting the skin of the test subject with electrodes comprised by the ECG device. The process of obtaining the recording is non-invasive and risk-free. The ECG is carried out for the diagnosis of atrial fibrillation, i.e. for the assessment of the presence of absence of atrial fibrillation in the test subject. In embodiment of the method of the present invention, the ECG device is a one-lead device (such as a one-lead handheld ECG-device).

In another preferred embodiment the ECG device is a 12-lead ECG device such as a Holter monitor.

Preferably, an amount of ESM-1 (and optionally an amount of the natriuretic peptide) in the sample from a test subject which is (are) increased as compared to the reference amount (or to the reference amounts) is indicative for a subject who shall be subjected to ECG, and/or an amount of ESM-1 (and optionally an amount of the natriuretic peptide) in the sample from a subject which is (are) decreased as compared to the reference amount (or to the reference amounts) is indicative for a subject who shall not be subjected to ECG.

In a preferred embodiment, the reference amount shall allow for differentiating between a subject who shall be subjected to ECG and a subject who shall not be subjected to ECG. Preferably, said reference amount is a predetermined value.

Method for the Assessment of a Therapy for Atrial Fibrillation

As used herein, the term "assessing a therapy for atrial fibrillation", preferably refers to the assessment of a therapy that aims to treat atrial fibrillation.

The therapy to be assessed can be any therapy that aims to treat atrial fibrillation. Preferably, said therapy is selected from the group consisting of administration of at least one anticoagulant, rhythm control, rate control, cardioversion and ablation. Said therapies are well known in the art and are e.g. reviewed in Fuster V et al. Circulation 2011; 123:e269-e367 which herewith is incorporated by reference in its entirety.

In an embodiment, the therapy is the administration of at least one anticoagulant. The administration of at least one anticoagulant shall aim to reduce or prevent coagulation of blood and related stroke. In an embodiment, at least one anticoagulant is selected from the group consisting of heparin, a coumarin derivative, such as warfarin or dicumarol, tissue factor pathway inhibitor (TFPI), antithrombin III, factor IXa inhibitors, factor Xa inhibitors, inhibitors of factors Va and VIIIa and thrombin inhibitors (anti-IIa type).

In a preferred embodiment, the assessment of a therapy for atrial fibrillation is the monitoring of said therapy. In this embodiment, the reference amount is preferably the amount for ESM-1 in an earlier obtained sample (i.e. in a sample that has been obtained prior to the test sample in step a).

Optionally, the amount of a natriuretic peptide is determined in addition to the amount of ESM-1.

Accordingly, the present invention relates to a method for monitoring a therapy for atrial fibrillation in subject, said subject preferably suffering from atrial fibrillation, wherein said method comprises the steps of
a) determining the amount of ESM-1 (and optionally the amount of a natriuretic peptide) in a sample from the subject, and
b) comparing the amount of ESM-1 to a reference amount, wherein said reference amount is the amount of ESM-1 in a sample which has been obtained from said subject prior to the sample in step a), and optionally comparing the amount of the natriuretic peptide to a reference amount, wherein said reference amount is the amount of the natriuretic peptide in a sample which has been obtained from said subject prior to the sample in step a)

The sample in step a) is herein also referred to as "test sample", the sample in step b) is referred to herein as "reference sample".

The term "monitoring" as used herein, preferably, relates to assessing the effects a therapy as referred to herein elsewhere. Thus, the efficacy of a therapy (such as anticoagulation therapy) is monitored.

The aforementioned method may comprise the further step of monitoring the therapy based on the results of the comparison step carried out in step c). As will be understood by those skilled in the art, the prediction of a risk is usually not intended to be correct for 100% of the subjects. The term, however, requires that prediction can be made for a statistically significant portion of subjects in a proper and correct manner Thus, the actual monitoring may comprise further steps such as the confirmation.

Preferably, by carrying out the method of the present invention it can be assessed whether the subject responds to said therapy or not. A subject responds to a therapy if the condition the subject improves between obtaining the first and the second sample. Preferably, a subject does not respond to the therapy if the condition worsened between obtaining the first and the second sample.

Preferably, the reference sample is obtained prior to the initiation of said therapy. More preferably, the sample is obtained within one week in particular within two weeks prior to the initiation of said therapy. However, it is also contemplated that the reference sample may is obtained after initiation of said therapy (but before the test sample is obtained). In this case an ongoing therapy is monitored.

Thus, the test sample shall be obtained after the reference sample. It is to be understood that the test sample shall be obtained after the initiation of said therapy.

Moreover, it is particularly contemplated that the test sample is obtained after a reasonable period of time after obtaining the reference sample. It is to be understood, that the amounts of biomarkers referred herein, do not instantly change (e.g. within 1 minute or 1 hour) Therefore, "reasonable" in this context refers to intervals between obtaining the first and test sample which intervals allow the biomarker(s) to adjust. Therefore, the test sample, preferably, is obtained at least one month after said reference sample, at least three months, or, in particular, at least six month after said reference sample.

Preferably, a decrease and, more preferably, a significant decrease, and, most preferably, a statistically significant decrease of the amount(s) of the biomarker(s), i.e., of ESM-1 and optionally of the natriuretic peptide in the test sample as compared to the amount(s) of the biomarker(s) in the reference sample is indicative for a subject who responds to the therapy. Thus, the therapy is efficient. Also preferably, a an increase, more preferably, a significant increase, most preferably, a statistically significant increase of the amount(s) of the biomarker(s) in the test sample as compared to the amount(s) of the biomarker(s) in the reference sample is indicative for a subject who does not respond to the therapy. Thus, the therapy is not efficient.

A subject is considered to respond to the therapy, if the therapy reduces the risk of the subject of recurrence of atrial fibrillation. A subject is considered as not to respond to the therapy, if the therapy does not the risk of the subject of recurrence of atrial fibrillation.

In an embodiment, the intensity of the therapy is increased if the subject does not respond to the therapy. Moreover, it is envisaged that the intensity of the therapy is decreased if a subject responds to the therapy. For example, the intensity of a therapy can be increased by increasing the dosage of the administered medicament. For example, the intensity of a therapy can be decreased by decreasing the dosage of the administered medicament.

In another preferred embodiment, the assessment of a therapy for atrial fibrillation is the guidance of a therapy for atrial fibrillation. The term "guidance" as used herein, preferably, relates to adjusting the intensity of a therapy, such as increasing or decreasing the dose of oral anticoagulation, based on the determination of the biomarker, i.e. ESM-1, during therapy.

In a further preferred embodiment, the assessment of a therapy for atrial fibrillation is the stratification of a therapy for atrial fibrillation. Thus, a subject shall be identified who is eligible to a certain therapy for atrial fibrillation. The term "stratification" as used herein, preferably, relates to selecting an adequate therapy based on the particular risk, molecular path identified and/or expected efficacy of the particular drug or procedure. Depending on the risk detected, particularly patients with minimal or no symptoms related to the arrhythmia will become eligible to control of the ventricular rate, cardioversion or ablation, who otherwise would receive only antithrombotic therapy.

The terms "significant" and "statistically significant" are known by the person skilled in the art. Thus, whether an increase or decrease is significant or statistically significant can be determined without further ado by the person skilled in the art using various well known statistic evaluation tools. For example, a significant increase or decrease is an increase or decrease of at least 10%, in particular of at least 20%.

The present invention further concerns a method of aiding in the assessment of atrial fibrillation, said method comprising the steps of:
a) obtaining a sample from a subject as referred to herein in connection with the method of assessing atrial fibrillation,
b) determining the amount of the biomarker ESM-1 and optionally the amount of a natriuretic peptide in said sample, and
c) providing information on the determined amount of the biomarker ESM-1 and optionally on the determined amount of the natriuretic peptide to the attending physician of the subject, thereby aiding in the assessment of atrial fibrillation in said subject.

The attending physician shall be the physician who requested the determination of the biomarker(s). The aforementioned method shall aid the attending physician in the assessment of atrial fibrillation. Thus, the method does not encompass the diagnosis, prediction, monitoring, differentiation, identification as referred to above in connection with the method of assessing atrial fibrillation.

Step a) of the aforementioned method of obtaining the sample does not encompass the drawing of the sample from the subject. Preferably, the sample is obtained by receiving a sample from said subject. Thus, the sample can have been delivered.

In an embodiment, the method above is a method of aiding in the prediction of stroke, said method comprising the steps of:
a) obtaining a sample from a subject as referred to herein in connection with the method of assessing atrial fibrillation, in particular in connection with the method of predicting atrial fibrillation,
b) determining the amount of the biomarker ESM-1 and optionally the amount of a natriuretic peptide in said sample, and
c) providing information on the determined amount of the biomarker ESM-1 and optionally on the determined amount of the natriuretic peptide to the attending physician of the subject, thereby aiding in the prediction of stroke.

The present invention further relates to a method, comprising:
a) providing a test for the biomarker ESM-1 and optionally a test for the a natriuretic peptide and
b) providing instructions for using of test results obtained or obtainable by said test(s) in the assessment of atrial fibrillation.

The purpose of the aforementioned method is, preferably, the aid in the assessment of atrial fibrillation.

The instructions shall contain a protocol for carrying out the method of assessing atrial fibrillation as described herein above. Further, the instructions shall contain at least one value for a reference amount for ESM-1 and optionally at least one value for a reference amount for a natriuretic peptide.

The "test" is preferably a kit adapted to carry out the method of assessing atrial fibrillation. The term "Kit" is explained herein below. E.g. said kit shall comprise at least one detection agent for the biomarker ESM-1 and optionally at least one detection agent for a natriuretic peptide. The detection agents for the two biomarkers can be provided in a single kit or in two separate kits.

The test result obtained or obtainable by said test, is the value for the amount of the biomarker(s).

In an embodiment, step b) comprises providing instructions for using of test results obtained or obtainable by said test(s) in prediction of stroke (as described herein elsewhere).

Moreover, the present invention relates to the use of
i) the biomarker ESM-1 and optionally a natriuretic peptide and/or ii) at least one detection agent that specifically binds to ESM-1, and optionally at least one detection agent that specifically binds to a natriuretic peptide, in a sample from a subject for assessing atrial fibrillation.

In an embodiment, the present invention relates to the use of i) the biomarker ESM-1 and optionally a natriuretic peptide and/or ii) at least one detection agent that specifically binds to ESM-1, and optionally at least one detection agent that specifically binds to a natriuretic peptide, in a sample from a subject for predicting stroke.

The present invention further concerns the use of i) the biomarker ESM-1 and/or ii) at least one detection agent that specifically binds to ESM-1, in a sample from a subject, in combination with a clinical stroke risk score, for predicting the risk of a subject to suffer from stroke.

Also, the present invention relates to the use of i) the biomarker ESM-1 and/or ii) at least one detection agent that specifically binds to ESM-1 in a sample from a subject for improving the prediction accuracy of a clinical stroke risk score.

The terms mentioned in connection with the aforementioned use such as "sample", "subject", "detection agent", "ESM-1", "specifically binding", "atrial fibrillation", and "assessing atrial fibrillation" have been defined in connection with the method for assessing atrial fibrillation. The definitions and explanations apply accordingly.

Preferably, the aforementioned use is an in vitro use. Moreover, the detection agent is preferably and antibody such as a monoclonal antibody (or an antigen binding fragment thereof).

Further, is has been shown in the studies of the present invention that the determination of the amount of ESM-1 in a sample from a subject allows for the diagnosis of heart failure and of structural or functional abnormalities of the heart associated with heart failure. Accordingly, the present invention also contemplates a method for diagnosing heart failure and/or at least one structural or functional abnormality associated with heart failure based on biomarker ESM-1.

The definitions given herein above apply mutatis mutandis to the following (except if stated otherwise).

Accordingly, the present invention further relates to a method for diagnosing heart failure and/or at least one structural or functional abnormality of the heart associated with heart failure in a subject, said method comprising the steps of a) determining the amount of ESM-1 in a sample from the subject, and b) comparing the amount of ESM-1 to a reference amount, whereby heart failure and/or at least one structural or functional abnormality of the heart associated with heart failure is to be diagnosed.

The term "diagnosing" as used herein means assessing whether a subject as referred to in accordance with the method of the present invention suffers from heart failure and/or from at least one structural or functional abnormality of the heart associated with heart failure, or not. In an embodiment, it is diagnosed that a subject suffers from heart failure and/or at least one structural or functional abnormality of the heart associated with heart failure. In an alternative embodiment, it is diagnosed that a subject does not suffer from heart failure and/or at least one structural or functional abnormality of the heart associated with heart failure (rule out of heart failure and/or at least one structural and or function abnormality of the heart).

The actual diagnosis whether a subject suffers from heart failure and/or from said at least one abnormality, or not may comprise further steps such as the confirmation of a diagnosis. Thus, the diagnosis of heart failure and/or at least one structural or functional abnormality of the heart associated with heart failure is understood as an aid in the diagnosis of heart failure and/or of at least one structural or functional abnormality. Accordingly, the term "diagnosing" in the context of the present invention also encompasses aiding the physician to assess whether a subject suffers from heart failure and/or said at least one abnormality, or not.

The term "heart failure" (abbreviated "HF") is well known by the skilled person. As used herein, the term preferably relates to an impaired systolic and/or diastolic function of the heart being accompanied by overt signs of heart failure as known to the person skilled in the art. Preferably, heart failure referred to herein is also chronic heart failure. Heart failure according to the present invention includes overt and/or advanced heart failure. In overt heart failure, the subject shows symptoms of heart failure as known to the person skilled in the art.

In an embodiment of present invention, the term "heart failure" refers to heart failure with reduced left ventricular ejection fraction (HFrEF).

In another embodiment of present invention, the term "heart failure" refers to heart failure with preserved left ventricular ejection fraction (HFpEF).

HF can be classified into various degrees of severity.

According to the NYHA (New York Heart Association) classification, heart failure patients are classified as belonging to NYHA classes I, II, III and IV. A patient having heart failure has already experienced structural and functional changes to his pericardium, myocardium, coronary circulation or cardiac valves. He will not be able to fully restore his health, and is in need of a treatment. Patients of NYHA Class I have no obvious symptoms of cardiovascular disease but already have objective evidence of functional impairment. Patients of NYHA class II have slight limitation of physical activity. Patients of NYHA class III show a marked limitation of physical activity. Patients of NYHA class IV are unable to carry out any physical activity without discomfort. They show symptoms of cardiac insufficiency at rest.

This functional classification is supplemented by the more recent classification by the American College of Cardiology and the American Heart Association (see J. Am. Coll. Cardiol. 2001; 38; 2101-2113, updated in 2005, see J. Am. Coll. Cardiol. 2005; 46; e1-e82). 4 stages A, B, C and D are defined. Stages A and B are not HF but are considered to help identify patients early before developing "truly" HF. Stages A and B patients are best defined as those with risk factors for the development of HF. For example, patients with coronary artery disease, hypertension, or diabetes mellitus who do not yet demonstrate impaired left ventricular (LV) function, hypertrophy, or geometric chamber distortion would be considered stage A, whereas patients who are asymptomatic but demonstrate LV hypertrophy and/or impaired LV function would be designated as stage B. Stage C then denotes patients with current or past symptoms of HF associated with underlying structural heart disease (the bulk of patients with HF), and stage D designates patients with truly refractory HF.

As used herein, the term "heart failure", preferably, includes stages A, B, C and D of the ACC/AHA classification referred to above. Also, the term includes NYHA class I, II, III and IV. Thus, the subject may or may not show typical symptoms of heart failure.

In a preferred embodiment, the term "heart failure" refers the heart failure stage A or, in particular heart failure stage B according to the ACC/AHA classification referred to above. The identification of these early stages, in particular of stage A, is advantageous because treatment could be initiated before irreversible damage occurs.

The at least one structural or functional abnormality of the heart associated with heart failure is preferably selected from a functional and/or structural damage of the myocardium, epicardium, valves, or coronary circulation; impaired pumping or filling capacity, often a systolic or a diastolic impairment; change in the geometry of the left ventricle; hypertension associated with geometric chamber distortion; left ventricular hypertrophy; left ventricular structural changes with or without left ventricular hypertrophy; increased septum diameter; increased posterial wall diameter, concentric increased myocardial enlargement, eccentric increased myocardial enlargement, diastolic left ventricular dysfunction.

In an embodiment of the present invention, the structural or functional abnormality of the heart associated with heart failure is left ventricular hypertrophy.

As set forth elsewhere herein, the biomarker ESM-1 could be increased in various diseases and disorders other than atrial fibrillation. In an embodiment of the aforementioned method of the present invention, it is envisaged that the subject does not suffer from such diseases and disorders. For example, it is envisaged that the subject shall not suffer from chronic kidney disease, diabetes, cancer, coronary artery disease, hypertension, and/or kidney failure requiring dialysis. Further, it is envisaged that the subject does not have a history of stroke.

The subject to be tested in accordance with the method of diagnosing heart failure and/or at least one structural or functional abnormality of the heart associated with heart failure preferably does not suffer from atrial fibrillation. However, it is also envisaged the subject suffers from atrial fibrillation. The term "atrial fibrillation" is defined in connection with the method of assessing heart failure.

Preferably, the subject to be tested is suspected to suffer heart failure and/or at least one structural or functional abnormality of the heart associated with heart failure.

The term "reference amount" has been defined in connection with the method of assessing atrial fibrillation. The reference amount that is applied in the method for diagnosing heart failure and/or from at least one structural or functional abnormality of the heart associated with heart failure, in principle, can be determined as described above.

Preferably, an amount of ESM-1 in the sample from a subject which is increased as compared to the reference amount is indicative for a subject suffering from heart failure and/or from at least one structural or functional abnormality of the heart associated with heart failure and/or wherein an amount of ESM-1 in the sample from a subject which is decreased as compared to the reference amount is indicative for a subject not suffering from heart failure and/or from at least one structural or functional abnormality of the heart associated with heart failure.

In an embodiment of the method for diagnosing heart failure and/or at least one structural or functional abnormality of the heart associated with heart failure in a subject, step a) further comprises the determination of the amount of a natriuretic peptide in the sample from the subject. In step b) of the method, the thus determined amount of this marker is compared to a reference amount.

Preferably, the ratio of NT-proBNP/ESM-1 is indicative for differentiating a subject suffering from heart failure from atrial fibrillation—as set forth herein below.

Moreover, the present invention relates to the use of
i) the biomarker ESM-1 and optionally a natriuretic peptide and/or
ii) at least one detection agent that specifically binds to ESM-1, and optionally at least one detection agent that specifically binds to a natriuretic peptide,
in a sample of a subject for diagnosing heart failure and/or at least one structural or functional abnormality of the heart associated with heart failure.

The present invention further concerns a method of aiding in the diagnosis of heart failure and/or of at least one structural or functional abnormality of the heart associated with heart failure in a subject, said method comprising the steps of:
 a) obtaining a sample from a subject as referred to herein in connection with the method of diagnosing heart failure and/or at least one structural or functional abnormality of the heart associated with heart failure in a subject,
 b) determining the amount of the biomarker ESM-1 and optionally the amount of a natriuretic peptide in said sample, and
 c) providing information on the determined amount of the biomarker ESM-1 and optionally on the determined amount of the natriuretic peptide to the attending physician of the subject, thereby aiding in the in the diagnosis of heart failure and/or of at least one structural or functional abnormality of the heart associated with heart failure in said subject.

The attending physician is the physician who requested the determination of the biomarker(s). The aforementioned method shall aid the attending physician in the assessment of atrial fibrillation. Thus, the method does not encompass the diagnosis, prediction, monitoring, differentiation, identification as referred to above in connection with the method of diagnosing heart failure and/or at least one structural or functional abnormality of the heart associated with heart failure.

Step a) of the aforementioned method of obtaining the sample does not encompass the drawing of the sample from the subject. Preferably, the sample is obtained by receiving a sample from said subject. Thus, the sample shall have been delivered.

The present invention further relates to a method, comprising:
 a) providing a test for the biomarker ESM-1 and optionally a test for the a natriuretic peptide. and
 b) providing instructions for using of test results obtained or obtainable by said test(s) in diagnosing heart failure and/or at least one structural or functional abnormality of the heart associated with heart failure.

The purpose of the aforementioned method is, preferably, the aid in the diagnosis of heart failure and/or of at least one structural or functional abnormality of the heart.

The instructions shall contain a protocol for carrying out the method of diagnosing heart failure and/or at least one structural or functional abnormality of the heart as described herein above. Further, the instructions shall contain at least one value for a reference amount for ESM-1 and optionally at least one value for a reference amount for a natriuretic peptide.

The "test" is preferably a kit adapted to carry out the method of of diagnosing heart failure and/or at least one structural or functional abnormality of the heart. The term "Kit" is explained herein below. E.g. said kit shall comprise at least one detection agent for the biomarker ESM-1 and optionally at least one detection agent for a natriuretic peptide. The detection agents for the two biomarkers can be provided in a single kit or in two separate kits.

The test result obtained or obtainable by said test, is the value for the amount of the biomarker(s).

The present invention also relates to a kit. Preferably, said kit is adapted for carrying out the method of the present invention, i.e. the method for assessing atrial fibrillation or the method for diagnosing heart failure and/or at least one structural or functional abnormality of the heart associated with heart failure. Said kit shall comprising at least one agent which specifically binds ESM-1. In a preferred embodiment, said kit shall further comprise an agent which specifically binds to a natriuretic peptide (such as to NT-proBNP). Optionally, said kit comprises instructions for carrying out the said method.

The term "kit" as used herein refers to a collection of the aforementioned components, preferably, provided separately or within a single container. The container also comprises instructions for carrying out the method of the present invention. These instructions may be in the form of a manual or may be provided by a computer program code which is capable of carrying out the calculations and comparisons referred to in the methods of the present invention and to establish the assessment or diagnosis accordingly when implemented on a computer or a data processing device. The computer program code may be provided on a data storage medium or device such as an optical storage medium (e.g., a Compact Disc) or directly on a computer or data processing device. Moreover, the kit may, preferably, comprise standard amounts for the biomarker ESM-1 for calibration purposes. In a preferred embodiment, the kit further comprises standard amounts for the natriuretic peptide for calibration purposes In an embodiment, said kit is used for assessing atrial fibrillation in vitro.

In another embodiment, said kit is used for diagnosing heart failure and/or at least one structural or functional abnormality of the heart associated with heart failure in vitro.

Calculating a Ratio of ESM-1 and a Natriuretic Peptide.

Atrial fibrillation and heart failure share common risk factors that predispose to development of the disease, such as coronary artery disease. It is also established knowledge that patients with heart failure often develop atrial fibrillation and vice versa.

Figure 6:
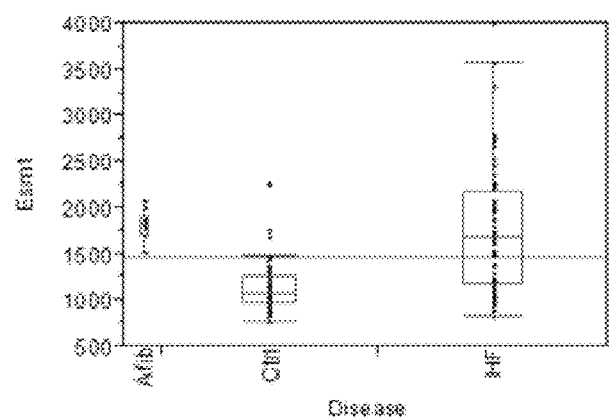
FIG. 6: ESM-1 in differentiation of Heart Failure and Atrial Fibrillation
Figure 7:
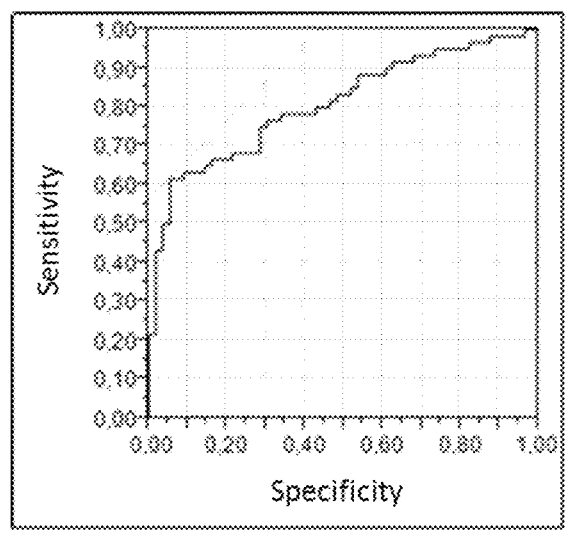
FIG. 7: ESM-1 in differentiation of Heart Failure; ROC curve for ESM-1; AUC=0.81
Figure 8:
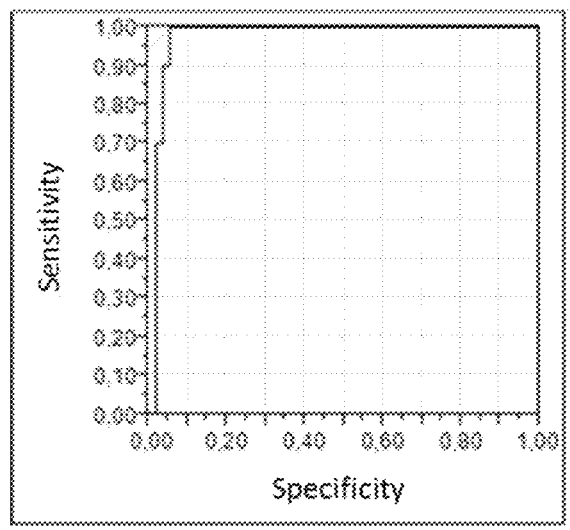
FIG. 8: ESM-1 in differentiation of Atrial Fibrillation; ROC curve for ESM-1 in Afib; AUC=0.98

The Examples show that ESM-1 is a marker for both atrial fibrillation and heart failure (see FIG. 6). Thus, the biomarker can be used for the diagnosis of heart failure and for the assessment of atrial fibrillation. For example, the presence of heart failure or atrial fibrillation can be ruled out in a subject based on the determination of ESM-1 (as described above).

If the level of ESM-1 is increased as compared to the reference amount, the subject in principle could suffer from atrial fibrillation or heart failure, or both. In this case, it would be advantageous to differentiate between heart failure and atrial fibrillation. The differentiation could be made by calculating a ratio of the amount of the natriuretic peptide (e.g. NT-proBNP or BNP) in the sample from the subject to the amount of ESM-1 in the sample from the subject.

Although the amount of natriuretic peptides is increased in samples from subjects suffering from atrial fibrillation, the amount of natriuretic peptides is, in general, much higher in samples from patients with heart failure than in patients with atrial fibrillation. For example, in samples from subjects who suffered from atrial fibrillation, but not from heart failure, levels up to 3000 pg/ml of NT-proBNP were observed in the studies underlying the present invention. In contrast, subjects who suffers from heart failure had NT-proBNP levels of up to 15000 pg/ml.

Due to the differences in the level of the natriuretic peptides, in particular of NT-proBNP, in subjects suffering from atrial fibrillation and in subjects suffering from heart failure, it is possible to differentiate between heart failure and atrial fibrillation in subjects with an increased level of ESM-1 (i.e. in subjects having an amount ESM-1 in a sample which is increased as compared to the reference amount).

Preferably, the diagnosis of heart failure or atrial fibrillation is further supported or verified by carrying out the further step of calculating a ratio of the amount of a natriuretic peptide to the amount of ESM-1 as determined in step a) of the method of assessing atrial fibrillation described above or as determined in step a) of the method of diagnosing heart failure and/or at least one structural or functional abnormality of the heart associated with heart failure. In a further step, said calculated ratio is compared to a reference ratio (of the amount of a natriuretic peptide to the amount the of ESM-1). Said reference ratio shall allow the differentiation between heart failure and atrial fibrillation (in particular subjects having an increased amount of ESM-1).

Thus, both the method of assessing atrial fibrillation (such as the method of diagnosing atrial fibrillation) and the method of diagnosing heart failure and/or at least one structural or functional abnormality of the heart associated with heart failure can comprise the further steps of calculating a ratio of the amount of the natriuretic peptide as determined in step to the amount of ESM-1 as determined in step a), and comparing said calculated ratio to a reference ratio.

The calculation step is preferably step c), the comparison step is preferably step d).

If steps c) and d) are carried out, the amounts of the biomarker ESM-1 and of a natriuretic peptide are determined in step a) of the methods for assessing atrial fibrillation and for diagnosing heart failure. In this case, it is however not required in step b) to compare the amounts of the natriuretic peptide to a reference amount. The method of the present invention can be carried out with and without this comparison in step b).

Thereby, the diagnosis of atrial fibrillation or the diagnosis of heart failure and/or at least one structural or functional abnormality of the heart associated with heart failure is verified, confirmed or supported. In particular, the ratio allows for reducing the number of false positives.

The calculation and comparison steps stated above are preferably carried out in subjects whose amount of ESM-1 in the sample as determined in step a) is increased as compared to the reference amount.

With respect to the method of assessing atrial fibrillation, in particular with respect to the diagnosis of atrial fibrillation, the following applies: Preferably, a ratio which is decreased as compared to the reference ratio, is indicative, i.e. further indicative. for a subject who suffers from atrial fibrillation. Accordingly, such a ratio confirms the diagnosis of atrial fibrillation based on steps a) and b). A ratio which is increased as compared to the reference ratio is indicative for heart failure. Thus, such a ratio indicates that the subject might not suffer from atrial fibrillation. Thus, further diagnostic measures such as ECG for the diagnosis of atrial fibrillation shall be recommended or initiated.

With respect to the method of diagnosing heart failure, the following applies: Preferably, a ratio which is increased as compared to the reference ratio, is indicative for a subject who suffers from heart failure. Thus, the increased ratio confirms the diagnosis of heart failure based on steps a) and b). A ratio which is decreased as compared to the reference ratio is indicative for the diagnosis that the subject does not heart failure. Thus, such a ratio indicates that the subject does not suffer from atrial fibrillation.

Thus, the present invention reports a method for diagnosing both diseases and detecting said risk factors in a subject comprising the steps of determining the amount of ESM-1 and NT-proBNP in a sample from the subject, and comparing the amounts of ESM-1 and NT-proBNP as a ratio. A subject who is suspected to suffer from heart failure shall have a higher ratio of NT-proBNP/ESM as compared to a subject suffering from atrial fibrillation.

All references cited in this specification are herewith incorporated by reference with respect to their entire disclosure content and the disclosure content specifically mentioned in this specification.

EXAMPLES

The invention will be merely illustrated by the following Examples. The said Examples shall, whatsoever, not be construed in a manner limiting the scope of the invention.

Example 1: Mapping Trial—Diagnose Patients with Atrial Fibrillation as Compared to Patients Based on their Different Circulating ESM-1 Levels The MAPPING study related to patients undergoing open chest surgery. Samples were obtained before anesthesia and surgery. Patients were electrophysiologically characterized using high-density epicardial mapping with multi-electrode arrays (high density mapping). The trial comprised 14 patients with paroxysmal atrial fibrillation, 16 patients with persistent atrial fibrillation and 30 controls, matched to best possible (on age, gender, comorbidities). ESM-1 was determined in samples of the MAPPING study. Elevated ESM-1 levels were observed in patients with atrial fibrillation versus controls. ESM-1 levels were elevated in patients with paroxysmal atrial fibrillation versus matched controls, as well as in patients with persistent atrial fibrillation versus controls.

In addition, the biomarker NT-proBNP was determined in samples from the MAPPING cohort. Interestingly, it was shown that the combined determination of ESM-1 and NT-proBNP allowed for an increase of the AUC to 0.91 for the differentiation between persistent AF vs. SR (sinus rhythm).

Example 2: Predictor Cohort—Screen and Identify Patients with Atrial Fibrillation Especially in an Elderly General Population The PREDICTOR study was a population-based trial in elderly (≥65 years), apparently healthy subjects (n=2001). Participants were referred to cardiology centers for clinical examination and comprehensive Doppler echocardiography and electrocardiogram measures. The patients suffered predominantly from heart failure stage B. However, some patients suffered from heart failure stage A or C. The atrial fibrillation sub-cohort comprises 40 subjects with an ongoing episode of atrial fibrillation during their visit and 116 matched controls. 33 patients showed risk factors of HF stage A and out of these 11 presented with ongoing atrial fibrillation at the time of sampling. 80 patients showed structural heart disease, HF stage B and out of these 21 presented with ongoing atrial fibrillation at the time of sampling. 37 patients suffered from HF stage C and out of these 6 presented with ongoing atrial fibrillation at the time of sampling.

ESM-1 and NT-proBNP were determined in the atrial fibrillation sub-cohort selected from the PREDICTOR study. Elevated circulating ESM-1 levels were observed in samples from subjects with ongoing atrial fibrillation versus controls. Slightly elevated circulating ESM-1 levels were observed in patients with structural and functional myocardial abnormalities (stage C HF) versus controls. Elevated circulating NT-proBNP levels, above 120 pg/mL were observed in subjects with ongoing atrial fibrillation versus controls. Elevated circulating NT-proBNP levels, above 120 pg/mL were observed in patients with stage C HF versus controls.

Example 3: Heart Failure Panel

The heart failure panel included 60 patients with chronic heart failure. According to the ESC guidelines criteria, heart failure was diagnosed in patients with typical signs and symptoms and objective evidence of a structural or functional abnormality of the heart at rest. Patients between 18 and 80 years with ischemic or dilated cardiomyopathy or significant valvular disease and who were able to sign the consent form were included into the study. Patients with acute myocardial infarction, pulmonary embolism or stroke in the last 6 months, further with severe pulmonary hypertension and end stage renal disease were excluded. The patients suffered predominantly from heart failure stages NYHA II-IV.

The atrial fibrillation cohort included 10 elderly patients (>60 years) including those with diagnosed hypertension and cardiac disorders.

The healthy control cohort included 56 subjects. The healthy status was verified and ECG and an echocardiography were obtained. Participants with any abnormality were excluded. Elevated ESM-1 levels were observed in patients with heart failure versus controls.

Example 4: GISSI AF Trial

The GISSI-AF trial was a double-blinded, randomized, placebo-controlled, multicenter trial that had enrolled 1442 patients in sinus rhythm with a known history of Atrial Fibrillation, documented by at least two or more episodes of symptomatic ECG-documented Atrial Fibrillation in the previous 6 months or successful electrical or pharmacologic cardioversion between 14 days and 48 h before randomization.

The rationale, design, and results of the trial have already been published in detail earlier (ref: Disertori M, et al., J Cardiovasc Med. 2006; 7:29-38; ref Staszewsky L et al., Cardiovasc Drugs Ther 2015; 29:551-561) and under Clinical Trials.gov (with identifier NCT00376272).

All patients were age >40 years and had been on a stable treatment for Atrial Fibrillation and of any underlying cardiovascular disorder for at least 1 month before enrollment. Previously prescribed ACE inhibitors, beta-blockers and amiodarone for cardiovascular co-morbidities were permitted to be continued taking. Patients were randomized to receive valsartan or placebo The primary end points in the main trial were to assess the effect of the angiotensin II type 1 receptor blocker, valsartan, on (a) the time to first recurrence of Atrial Fibrillation and (b) the proportion of patients with more than one episode of Atrial Fibrillation in the 1-year observation period. The biomarker substudy (N=382) comprised 203 subjects with and 179 controls without recurrent Atrial Fibrillation during the 12 months follow-up period (Masson S et al., Heart. 2010; 96:1909-14; Latini R et al., J Intern Med. 2011; 269:160-71). Blood samples were drawn at randomization and after 6 and 12 months of follow-up.

The biomarker ESM-1 was determined in the samples from the biomarker substudy. Elevated ESM-1 levels were observed in patients with atrial fibrillation versus controls (AUC 0.61).

Example 5: Biomarker Measurements

ESM-1 was measured in a commercially available microtiter plate based assay for Endothelial cell-specific molecule 1 (ESM-1); ELISA Kit from Abnova, Taiwan.

Example 6: Prediction of Stroke

Analysis Approach

The ability of circulating ESM-1 to predict the risk for the occurrence of stroke was assessed in a prospective, multicentric registry of patients with documented atrial fibrillation (Conen D., Forum Med Suisse 2012; 12:860-862). ESM-1 was measured in EDTA plasma using a stratified case cohort design as described in Borgan et al. (Borgan O. et al., Lifetime Data Analysis 2000; 6: 39-58):

While during blood draw persistent and paroxysmal cases were mainly in sinus rhythm, permanent patients were in atrial fibrillation status.

Sample Material was EDTA Plasma.

For each of the 70 patients which experienced a stroke during follow up ("events"), 2 matched controls were selected. Controls were matched based on the demographic and clinical information of age, sex, history of hypertension, atrial fibrillation type and history of heart failure (CHF history).

ESM-1 results were available for 69 AF patients with an event (i.e., stroke) and 138 AF patients without an event. The amount of, in total for 207 patients. At the time point of blood sampling 86 out of the 207 patients were diagnosed with paroxysmal, persistant atrial fibrillation, 50 out of 207 with persistent atrial fibrillation and 71 out of 207 with permanent AF in atrial fibrillation.

Maximum observation period (follow-up) for these subjects 207 patients was 42%, 24%, and 34%, respectively, and most of the paroxysmal AF patients were in sinus rhythm at the time of blood draw. The follow-up time for stroke 2615 days. Median follow-up was up to 6 years. 1450 days.

In order to quantify the univariate prognostic value of ESM-1 proportional hazard models were used with the outcome stroke. The univariate prognostic performance of ESM-1 was assessed by two different incorporations of the prognostic information given by ESM-1. The first proportional hazard model included ESM-1 binarized at the median (461 pg/ml) and therefore comparing the risk of patients with ESM-1 below the median versus patient with ESM-1 above the median. The second proportional hazard model included the original ESM-1 levels but transformed to a log 2 scale. The log 2 transformation was performed in order to enable a better model calibration. Because the estimates from a naïve proportional hazard model on the case control cohort would be biased (due to the altered proportion of cases to controls) a weighted proportional hazard model was used. Weights are based on the inverse probability for each patient to be selected for the case control cohort as described in Mark et al. (Mark S D et al., J Am Statistical Assoc 2006: 101: 460-471).

In order to get estimates for the absolute survival rates in the two groups based on the dichotomized baseline ESM-1 measurement (<461 pg/ml vs >=461 pg/ml) a weighted version of the Kaplan-Meier plot was created as described in et al. (Mark S D et al., J Am Statistical Assoc 2006: 101: 460-471).

In order to assess if the prognostic value of ESM-1 is independent from known clinical and demographic risk factors a weighted proportional cox model including in addition the variables age, sex, CHF history, history of hypertension, Stroke/TIA/Thromboembolism history, vascular disease history and diabetes history was calculated.

In order to assess the ability of ESM-1 to improve existing risk scores for the prognosis of stroke weighted proportional hazard models including the $CHADS_2$ respectively the $CHA_2DS_2$-VASc score and ESM-1 (log 2 transformed) were calculated.

The c-index of the $CHA_2DS_2$-VASc score was compared to the c-index of this model. For the calculation of the c-index in the case-cohort setting a weighted version of the c-index was used as proposed in Ganna et al. (Ganna A. et al., Am J Epidemiol 2012; 175 (7): 715-724).

Results

Table 1 shows the results of the two univariate weighted proportional hazard models including the binarized or the log 2 transformed ESM-1. The association between the risk for experiencing a stroke with the baseline value of ESM-1 is highly significant in both models. The hazard ration for the binarized ESM-1 implies a 2.78-fold higher risk for a stroke in the patient group with baseline ESM-1>=461 pg/ml versus the patient group with baseline ESM-1<461 pg/ml.

The results of the proportional hazard model including ESM-1 as log 2 transformed linear risk predictor suggest the log 2 transformed values ESM-1 are proportional to the risk for experiencing a stroke. The hazard ratio of 2.92 can be interpreted in a way that a 2-fold increase of ESM-1 is associated with 2.96 increase of risk for a stroke.

TABLE 1

Results result of the univariate weighted proportional hazard model including the binarized and log2 transformed ESM-1.

| | Hazard Ratio (HR) | 95%-CI HR | P-Value |
|---|---|---|---|
| ESM-1 log2 | 2.9640 | 1.9474-4.5112 | <0.001 |
| Baseline ESM-1 >=461 pg/ml vs ESM-1 <461 pg/ml | 2.7779 | 1.4897-5.1800 | 0.001 |

Figure 9:
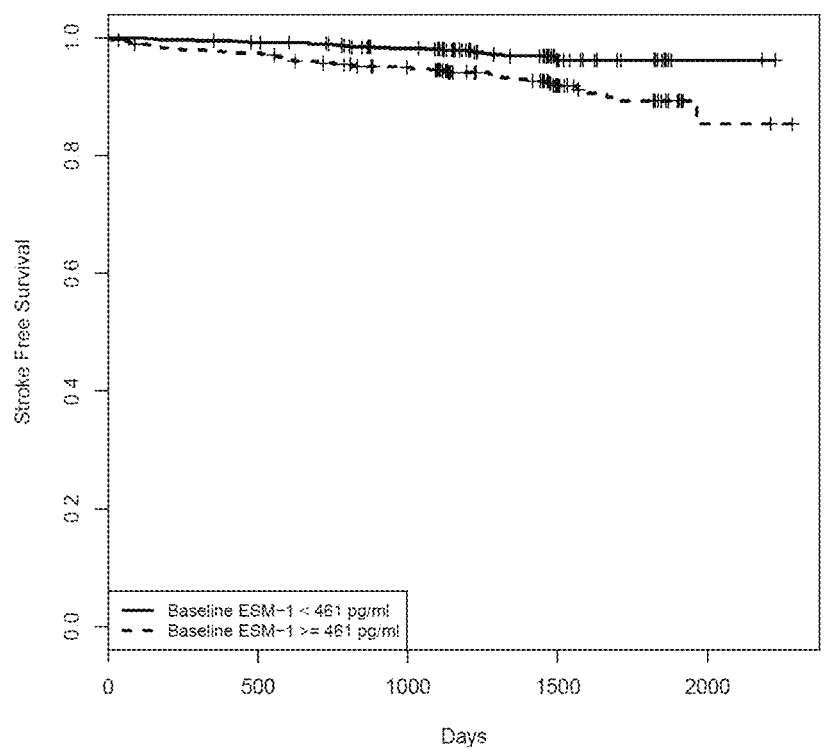
FIG. 9: Weighted Kaplan-Meier survival estimates for the two groups defined by baseline ESM-1 measurement <461 pg/ml vs >=461 pg/ml.

FIG. 9 shows the weighted Kaplan-Meier curves for the two patient groups with baseline ESM-1 measurement <461 pg/ml vs >=461 pg/ml. As easily seen, the risk for the two groups for the occurrence of a stroke differs significantly.

Table 2 shows the results of a proportional hazard model including ESM-1 (log 2 transformed) in the combination with clinical and demographic variables. It clearly shows that the prognostic effect of ESM-1 stays stable if adjusting for the prognostic effect of relevant clinical and demographic variables.

TABLE 2

Multivariate proportional hazard model including ESM-1 and relevant clinical and demographic variables.

| | Hazard Ratio (HR) | 95%-CI HR | P-Value |
|---|---|---|---|
| History hypertension | 1.2186 | 0.5984-2.4818 | 0.586 |
| Age | 1.0475 | 1.0038-1.093 | 0.033 |
| History Stroke/TIA/embolism | 1.7297 | 0.8459-3.537 | 0.133 |
| Sex = male | 0.9531 | 0.4843-1.8758 | 0.889 |
| History CHF | 0.6297 | 0.2374-1.6707 | 0.353 |
| History vascular disease | 0.892 | 0.3335-2.3853 | 0.820 |
| ESM-1 (log2 transformed) | 2.8144 | 1.6711-4.74 | <0.001 |

Table 3 shows the results of the weighted proportional hazard model combining the $CHADS_2$ score with ESM-1 (log 2 transformed). Also in this model ESM-1 can add prognostic information to the $CHADS_2$ score.

TABLE 3

Weighted proportional hazard model combining the $CHADS_2$ score with ESM-1 (log2 transformed)

| | Hazard Ratio (HR) | 95%-CI HR | P-Value |
|---|---|---|---|
| $CHADS_2$ score | 1.3933 | 1.0867-1.7864 | 0.009 |
| ESM-1 (log2 transformed) | 2.6112 | 1.6638-4.0981 | <0.001 |

Table 4 shows the results of the weighted proportional hazard model combining the $CHA_2DS_2$-VASc score with ESM-1 (log 2 transformed). Also in this model ESM-1 can add prognostic information to the $CHA_2DS_2$-VASc score.

TABLE 4

Weighted proportional hazard model combining the $CHA_2DS_2$-VASc score with ESM-1 (log2 transformed)

| | Hazard Ratio (HR) | 95%-CI HR | P-Value |
|---|---|---|---|
| $CHA_2DS_2$-VASc score | 1.3013 | 1.0760-1.5737 | 0.007 |
| ESM-1 (log2 transformed) | 2.3155 | 1.4291-3.7516 | <0.001 |

Table 5 shows the estimated c-indexes of ESM-1 alone, of the $CHADS_2$ and the $CHA_2DS_2$-VASc score on the complete BEAT-AF study (N=1537), of the $CHADS_2$ and the $CHA_2DS_2$-VASc score on the case cohort selection (N=207) and of the weighted proportional hazard model combining the $CHADS_2$ and the $CHA_2DS_2$-VASc score with ESM-1 (log 2) on the case cohort selection. As expected the c-indexes of the $CHADS_2$ and the $CHA_2DS_2$-VASc score for the complete cohort differs to some extend to the case cohort selection due the random sampling of the case control cohort. On the case control cohort, the addition of ESM-1 to $CHA_2DS_2$-VASc score improves the c-index by 0.057 which can be considered as a clinical meaningful improvement of the risk prediction. For the $CHADS_2$ score the c-index improvement is 0.064.

An improvement is observed for the prognostic value in permanent atrial fibrillation. Stronger improvement is observed in patients with paroxysmal atrial fibrillation. Whereas the strongest improvement appears in the patient group with persistent atrial fibrillation.

TABLE 5

C-indexes of ESM-1, the $CHADS_2$ and $CHA_2DS_2$-VASc score and their combination with ESM-1.

| | C-Index |
|---|---|
| ESM-1 univariate(case cohort selection) | 0.665 |
| $CHADS_2$ (complete BEAT-AF study) | 0.641 |
| $CHADS_2$ (case cohort selection | 0.649 |
| $CHADS_2$ + ESM-1 (case cohort selection) | 0.713 |
| $CHA_2DS_2$-VASc (complete BEAT-AF study) | 0.692 |
| $CHA_2DS_2$-VASc (case cohort selection) | 0.680 |
| $CHA_2DS_2$-VASc + ESM-1 (case cohort selection) | 0.737 |

Application

The results provided in this example suggest that ESM-1 can be used in several ways to predict the risk for a future stroke for a new patient, either alone, or as a combination to considerably improve the clinical scores in predicting stroke risk (such as $CHADS_2$ and $CHA_2DS_2$-VASc). For a new patient, ESM-1 could be measured and compared to a predefined cutoff (e.g. 461 pg/ml). If the measured value for the new patient is above the predefined cutoff the patient is considered to have a high risk for the experience of stroke and appropriate clinical measures could be initiated.

It is also possible to define more than two risk groups based on an increasing set of cutoffs. A patient would then be assigned to one of the risk groups based on the value of his ESM-1 measurement. The risk for a stroke would increase over the different risk groups.

Alternatively, it would be also possible to transform the results of ESM-1 directly into a continuous risk score based on pre-defined suitable transformation function.

In addition, it is possible to use the value of ESM-1 in a combination with a risk score based on clinical and demographic variables (e.g. $CHA_2DS_2$-VASc score) and thereby improve the precision of the risk prediction.

For a new patient the value for risk score would be assessed and combined in an appropriate way with the measured ESM-1 values (potentially log 2 transformed), e.g. by creating a weighted sum of the risk score results and the ESM-1 value with appropriate pre-defined weights (e.g. as shown in table 3).

The invention claimed is:

1. A method for assessing atrial fibrillation in a human subject with documented atrial fibrillation, comprising the steps of
    a) detecting the amount of Endocan (ESM-1) and optionally of a natriuretic peptide in a sample selected from the group consisting of blood, serum and plasma from the human subject, and
    b) comparing the amount of ESM-1 and optionally of the natriuretic peptide to a reference amount, wherein an amount of ESM-1 in the sample which is increased as compared to the reference amount is indicative for the subject being at risk of recurrence of atrial fibrillation; and
    c) administering to said human subject identified as at risk of atrial fibrillation at least one anticoagulant and/or an increased dosage of an already administered anticoagulant.

2. The method of claim 1, wherein the subject is suspected to suffer from atrial fibrillation, and wherein the assessment of atrial fibrillation is the diagnosis of atrial fibrillation.

3. The method of claim 2, wherein an amount of ESM-1 in the sample from a subject which is increased as compared to the reference amount is indicative for a subject suffering from atrial fibrillation.

4. The method of claim 1, wherein the amounts of ESM-1 and a natriuretic peptide are determined in step a), and wherein the method comprises the further steps of c) calculating a ratio of the amount of the natriuretic peptide as determined in step a) to the amount of ESM-1 as determined in step a), and comparing said calculated ratio to a reference ratio.

5. The method of claim 4, wherein a ratio which is decreased as compared to the reference ratio, is further indicative for a subject who suffers from atrial fibrillation.

6. The method of claim 1, wherein the subject is suffering from atrial fibrillation, and wherein the assessment of atrial fibrillation is the differentiation between paroxysmal and persistent atrial fibrillation, wherein an amount of ESM-1 in the sample from a subject which is increased as compared to the reference amount is indicative for a subject suffering from persistent atrial fibrillation and/or wherein an amount of ESM-1 in the sample from a subject which is decreased as compared to the reference amount is indicative for a subject suffering from paroxysmal atrial fibrillation.

7. The method of claim 1, wherein the assessment of atrial fibrillation is the identification of a subject who shall be subjected to electrocardiogra (ECG).

8. The method of claim 1, wherein the subject suffers from atrial fibrillation and wherein the assessment of atrial fibrillation is the assessment of a therapy for atrial fibrillation.

9. The method of claim 1, wherein the human subject with documented atrial fibrillation is on anticoagulation therapy.

10. The method of claim 1, wherein the anticoagulant is selected from the group consisting of heparin, a coumarin derivative, tissue factor pathway inhibitor (TFPI), antithrombin III, factor IXa inhibitors, factor Xa inhibitors, inhibitors of factors Va and VIIIa and thrombin inhibitors.

11. The method of claim 1, wherein the human subject suffering from atrial fibrillation is identified as at risk of an adverse event associated with atrial fibrillation within a period of 1 to 10 years.

* * * * *